United States Patent
Lin et al.

(10) Patent No.: US 12,231,565 B2
(45) Date of Patent: Feb. 18, 2025

(54) LOGIN AUTHENTICATION METHOD, APPARATUS, AND SYSTEM

(71) Applicant: Huawei Technologies Co., Ltd., Shenzhen (CN)

(72) Inventors: Long Lin, Shenzhen (CN); Huitao Cheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/793,322

(22) PCT Filed: Oct. 30, 2020

(86) PCT No.: PCT/CN2020/125209
§ 371 (c)(1),
(2) Date: Jul. 15, 2022

(87) PCT Pub. No.: WO2021/143280
PCT Pub. Date: Jul. 22, 2021

(65) Prior Publication Data
US 2023/0353363 A1    Nov. 2, 2023

(30) Foreign Application Priority Data
Jan. 19, 2020   (CN) .......................... 202010060167.2

(51) Int. Cl.
*H04L 9/32*      (2006.01)
*G06F 21/33*     (2013.01)
(Continued)

(52) U.S. Cl.
CPC .......... *H04L 9/3213* (2013.01); *G06F 21/335* (2013.01); *G06F 21/35* (2013.01);
(Continued)

(58) Field of Classification Search
CPC ............... H04L 9/3213; H04L 63/0807; H04L 63/0853; G06F 21/335; G06F 21/35;
(Continued)

(56) References Cited

U.S. PATENT DOCUMENTS

| 578,443 A | 3/1897 | Brinkman |
| 8,775,810 B1 | 7/2014 | Snodgrass et al. |

(Continued)

FOREIGN PATENT DOCUMENTS

| CN | 103378876 A | 10/2013 |
| CN | 103647587 A | 3/2014 |

(Continued)

OTHER PUBLICATIONS

Zhang, "Design of cross-domain single sign-on system based on original account," Information Technology, Issue 3, Total 5 pages (2019). With an English Abstract,.

(Continued)

*Primary Examiner* — Cheng-Feng Huang
(74) *Attorney, Agent, or Firm* — Leydig, Voit & Mayer, Ltd.

(57) ABSTRACT

This application provides a login authentication method, apparatus, and system, and relates to the field of communication technologies. The method includes the following: A first terminal obtains a short-distance communication identifier of a second terminal; when the second terminal is determined to be a trusted device based on the short-distance communication identifier, a second token of the second terminal is obtained, and validity of a first token and the second token is verified by using a server; and when the verification of both the first token and the second token succeeds, a target account is automatically logged in to,
(Continued)

where the second token is applied for by the second terminal from the server by logging in to the target account in advance.

11 Claims, 9 Drawing Sheets

(51) Int. Cl.
| | | |
|---|---|---|
| *G06F 21/35* | (2013.01) | |
| *H04L 9/40* | (2022.01) | |
| *H04W 12/06* | (2021.01) | |
| *H04W 12/069* | (2021.01) | |
| *H04W 12/50* | (2021.01) | |
| *H04W 4/40* | (2018.01) | |
| *H04W 4/80* | (2018.01) | |

(52) U.S. Cl.
CPC ......... *H04L 63/0807* (2013.01); *H04W 12/06* (2013.01); *H04W 12/069* (2021.01); *H04W 12/50* (2021.01); *H04L 63/0853* (2013.01); *H04W 4/40* (2018.02); *H04W 4/80* (2018.02)

(58) Field of Classification Search
CPC ... H04W 12/06; H04W 12/069; H04W 12/50; H04W 4/80; H04W 4/40; H04W 12/63; H04W 4/48
See application file for complete search history.

(56) References Cited

U.S. PATENT DOCUMENTS

| | | |
|---|---|---|
| 2013/0318249 A1 | 11/2013 | Mcdonough et al. |
| 2014/0189840 A1 | 7/2014 | Metke et al. |
| 2016/0119319 A1 | 4/2016 | Hua |
| 2018/0191700 A1* | 7/2018 | Kong .................. H04L 63/0807 |
| 2020/0137056 A1* | 4/2020 | Havaralu Rama Chandra Adiga .................. H04L 63/0892 |
| 2020/0252389 A1* | 8/2020 | Cao ........................ H04L 9/3213 |

FOREIGN PATENT DOCUMENTS

| | | |
|---|---|---|
| CN | 103986738 A | 8/2014 |
| CN | 104135494 A | 11/2014 |
| CN | 105069345 A | 11/2015 |
| CN | 105245541 A | 1/2016 |
| CN | 105471913 A | 4/2016 |
| CN | 105938526 A | 9/2016 |
| CN | 107888559 A | 4/2018 |
| CN | 108292454 A | 7/2018 |
| CN | 109088849 A | 12/2018 |
| CN | 109286649 A | 1/2019 |
| CN | 109309683 A | 2/2019 |
| CN | 110278187 A | 9/2019 |
| CO | 106330445 A | 1/2017 |
| EP | 2747374 A1 | 6/2014 |
| WO | 2018138713 A1 | 8/2018 |

OTHER PUBLICATIONS

Varshney et al., "A New Secure Authentication Scheme for Web Login Using BLE Smart Devices," 2017 11th IEEE International Conference on Anti-counterfeiting, Security, and Identification (ASID), Total 4 pages, Institute of Electrical and Electronics Engineers, New York, New York (2017).

* cited by examiner

LOGIN AUTHENTICATION METHOD, APPARATUS, AND SYSTEM

CROSS-REFERENCE TO RELATED APPLICATIONS

This application is a National Stage of International Application No. PCT/CN2020/125209 filed on Oct. 30, 2020, which claims priority to Chinese Patent Application No. 202010060167.2, filed on Jan. 19, 2020, both of which are hereby incorporated by reference in their entireties.

TECHNICAL FIELD

This application relates to the field of communication technologies, and in particular, to a login authentication method, apparatus, and system.

BACKGROUND

With development of Internet technologies, more applications are extended from a computer end to a second terminal. For ease of use by a user, these applications generally allow the user to log in to a same account simultaneously on a computer end and on a second terminal, so that the user can enjoy a same application service simultaneously on different terminals.

As types of terminals that access the Internet increase, the user may log in to an application on more types of terminal devices. For example, some applications begin to support a user to log in to an account on a vehicle-mounted terminal to enjoy a related application service. In specific use, a conventional login manner is that the user logs in to an application by entering account information such as a user name and a password. Because this login manner is considered to be inconvenient, currently, many applications provide an automatic login manner. For example, after the user enables an automatic login function of an application on a vehicle-mounted terminal, when a vehicle is started, the vehicle-mounted terminal automatically logs in to the application based on account information stored during initial login.

However, according to the foregoing automatic login manner, in a case such as vehicle lending, there is a risk that personal information of a vehicle owner is leaked, and therefore security is low:

SUMMARY

In view of this, this application provides a login authentication method, apparatus, and system, to improve automatic login security of a terminal device.

To achieve the foregoing objective, according to a first aspect, an embodiment of this application provides a login authentication method, applied to a first terminal, where the method may include:
  obtaining a short-distance communication identifier of a second terminal; when the second terminal is determined to be a trusted device based on the short-distance communication identifier, obtaining a second token of the second terminal, and verifying validity of the second token by using a server; and when the verification of the second token succeeds, automatically logging in to a target account. The second token is applied for by the second terminal from the server by logging in to the target account in advance.

According to the login authentication method provided in this embodiment of this application, before automatically logging in to the target account, the first terminal first determines, based on the short-distance communication identifier of the nearby second terminal, whether the second terminal is a trusted device. Then, when determining that the second terminal is a trusted device, the first terminal verifies, by using the server, validity of the second token that the second terminal applies for from the server in advance, and automatically logs in to the target account when the verification on the second token succeeds. In this way, automatic login security of the first terminal can be effectively improved.

In a possible implementation of the first aspect, that the second terminal is determined to be a trusted device based on the short-distance communication identifier includes: when the short-distance communication identifier is included in a pre-established trusted list, the second terminal is determined to be a trusted device.

In the foregoing implementation, the trusted list is used to determine whether the second terminal is a trusted device, where both a manner for establishing the trusted list and a manner for verifying a trusted device are simple and convenient.

In a possible implementation of the first aspect, before the obtaining a short-distance communication identifier of a second terminal, the method further includes: when the target account is successfully logged in to, adding the short-distance communication identifier of the second terminal to the trusted list based on a configuration operation performed by a user, where a short-distance communication connection is established between the second terminal and the first terminal.

In the foregoing implementation, the trusted list is established based on the configuration operation performed by the user, so that reliability of the established trusted list can be improved.

In a possible implementation of the first aspect, the obtaining a short-distance communication identifier of a second terminal includes: obtaining the short-distance communication identifier of the second terminal when the first terminal stores a first token and is in a logout state, where the first token is applied for by the first terminal from the server by logging in to the target account in advance; and
  the automatically logging in to a target account includes:
    when verification of the first token succeeds, automatically logging in to the target account.

In the foregoing implementation, the target account is automatically logged in to by using the first token. In this way, the first terminal does not need to store account information such as an account password of a user, so that user data security can be improved.

In a possible implementation of the first aspect, before the obtaining the short-distance communication identifier of the second terminal when the first terminal stores a first token and is in a logout state, the method further includes: when the first terminal does not store the first token, sending a token obtaining request to the server in a process of logging in to the target account, where the token obtaining request is used to request the server to return the first token when verification of a target account login request of the first terminal succeeds; and receiving and storing the first token returned by the server.

In a possible implementation of the first aspect, the method further includes: when it is detected that a user enters an operation of logging out of the target account on the first terminal, performing a logout operation, and clearing the first token. In this way, user data privacy may be better protected.

In a possible implementation of the first aspect, before the obtaining a second token of the second terminal, the method further includes: establishing a short-distance communication connection to the second terminal. This may facilitate data transmission between the first terminal and the second terminal.

In a possible implementation of the first aspect, before verifying validity of the first token and the second token by using the server, and after the establishing a short-distance communication connection to the second terminal, the method further includes:

when the second terminal is determined to be a trusted device based on the short-distance communication identifier, sending a check code request to the server, where the check code request carries the first token, and the check code request is used to indicate the server to return a check code when verification of the first token succeeds; after the check code returned by the server is received, sending the check code to the second terminal, to indicate the second terminal to send the check code to the server for verification; and determining that the verification of the check code succeeds.

In the foregoing implementation, before token verification is performed, check code verification is first performed. In this way, trust of the second terminal in the first terminal may be established, and data security of the second terminal is improved.

In a possible implementation of the first aspect, the determining that the verification of the check code succeeds includes: when a unique account identifier returned by the second terminal is received, determining that the verification of the check code succeeds, where the unique account identifier returned by the second terminal is a unique identifier that is of a logged-in account and that is sent by the second terminal when the verification of the check code succeeds.

Before the obtaining a second token of the second terminal, the method further includes: determining that the received unique account identifier is consistent with a unique account identifier of the target account.

In the foregoing implementation, before token verification is performed, account consistency check is performed. In this way, trust of the first terminal in the second terminal may be further established, so that automatic login security of the first terminal is further improved.

In a possible implementation of the first aspect, the verifying validity of the first token and the second token by using the server includes: sending the first token to the second terminal, to indicate the second terminal to send the first token to the server for validity verification, and indicate the second terminal to return the second token after the verification of the first token succeeds; and when the second token sent by the second terminal is received, sending the second token to the server for validity verification.

In the foregoing implementation, the second terminal and the first terminal perform mutual token authentication, so that data security of the second terminal and the first terminal can be improved.

In a possible implementation of the first aspect, both the first token sent by the first terminal to the second terminal and the second token received from the second terminal undergo encryption processing, both the first token sent by the second terminal to the server and the second token sent by the first terminal to the server undergo decryption processing, and both the encryption processing and the decryption processing are performed based on a predetermined key. In this way, security of data exchange between the first terminal and the second terminal can be improved.

In a possible implementation of the first aspect, the key is an asymmetric key. In this way, security of data exchange between the first terminal and the second terminal can be further improved.

In a possible implementation of the first aspect, the method further includes: periodically sending, based on a preset time interval, the second token to the server for verification; when the verification fails, re-obtaining a second token from the second terminal, and sending the second token to the server for verification; and when the verification of the re-obtained second token fails, performing a logout operation. In this way, automatic login security of the first terminal can be further improved.

According to a second aspect, an embodiment of this application provides a login authentication method, applied to a second terminal, and the method includes: sending a short-distance communication identifier to a first terminal in response to a request of the first terminal for obtaining the short-distance communication identifier; receiving, when a target account is successfully logged in to, a first token sent by the first terminal, and sending the first token to a server for validity verification, where the first token is sent by the first terminal when the first terminal determines, based on the short-distance communication identifier, that the second terminal is a trusted device; and receiving a first token verification result returned by the server, and returning a second token to the first terminal when the verification of the first token succeeds, to indicate the first terminal to send the second token to the server for validity verification, and indicate the first terminal to automatically log in to the target account when the verification of the second token succeeds. The first token is applied for by the first terminal from the server by logging in to the target account in advance, and the second token is applied for by the second terminal from the server by logging in to the target account in advance.

In a possible implementation of the second aspect, before the receiving, when a target account is successfully logged in to, a first token sent by the first terminal, the method further includes: when the second terminal does not store the second token, sending a token obtaining request to the server in a process of logging in to the target account, where the token obtaining request is used to request the server to return the second token when verification of a target account login request of the second terminal succeeds; and receiving and storing the second token returned by the server.

In a possible implementation of the second aspect, the method further includes: when it is detected that a user enters an operation of logging out of the target account on the first terminal, performing a logout operation, and clearing the second token.

In a possible implementation of the second aspect, before the receiving a first token of the first terminal, the method further includes: establishing a short-distance communication connection to the first terminal.

In a possible implementation of the second aspect, before the receiving a first token of the first terminal, and after the establishing a short-distance communication connection to the first terminal, the method further includes:

receiving a check code sent by a first terminal, where the check code is requested from the server when the first terminal determines, based on the short-distance communication identifier, that the second terminal is a trusted device; sending the check code to the server for verification; receiving a check code verification result returned by the server; and determining that the verification of the check code succeeds.

In a possible implementation of the second aspect, the method further includes: sending a unique account identifier of a logged-in account to the first terminal, so that the first terminal determines that the received unique account identifier is consistent with a unique account identifier of the target account.

According to a third aspect, an embodiment of this application provides a login authentication method, applied to a server, and the method includes:
  receiving a check code request sent by a first terminal, and returning a check code to the first terminal when verification of a first token succeeds, where the check code request carries the first token, the check code request is sent by the first terminal when the first terminal determines that a second terminal is a trusted device, and the first token is applied for by the first terminal from the server by logging in to a target account in advance;
  receiving a check code verification request that is sent by the second terminal and that carries a check code, and when verification of the check code succeeds, returning a check code verification result to the second terminal, where the check code verification request is sent by the second terminal after the second terminal receives the check code sent by the first terminal;
  receiving the first token sent by the second terminal, performing validity verification on the first token, and returning a first token verification result to the second terminal, where the first token is sent by the first terminal to the second terminal when the first terminal determines that the verification of the check code succeeds; and
  receiving a second token sent by the first terminal, performing validity verification on the second token, and then returning a second token verification result to the first terminal, so that the first terminal automatically logs in to the target account when the verification of the second token succeeds, where the second token is sent by the first terminal when the first terminal determines that the verification of the first token succeeds, and the second token is applied for by the second terminal from the server by logging in to the target account in advance.

In a possible implementation of the third aspect, the method further includes: receiving a token obtaining request sent by the first terminal; and when verification of a target account login request of the first terminal succeeds, returning the first token to the first terminal.

In a possible implementation of the third aspect, the method further includes: receiving a token obtaining request sent by the second terminal; and when verification of a target account login request of the second terminal succeeds, returning the second token to the second terminal.

In a possible implementation of the third aspect, before the receiving the first token sent by the second terminal, the method further includes: receiving a check code request sent by the first terminal, where the check code request carries the first token; returning a check code to the first terminal when the verification of the first token succeeds; receiving a check code verification request that is sent by the second terminal and that carries a check code; and when verification of the check code succeeds, returning a check code verification result to the second terminal.

According to a fourth aspect, an embodiment of this application provides a login authentication apparatus, applied to a first terminal, and the apparatus includes:
  a short-distance communication unit, configured to: obtain a short-distance communication identifier of a second terminal when the first terminal stores a first token and is in a logout state, and determine, based on the short-distance communication identifier, whether the second terminal is a trusted device, where the first token is applied for by the first terminal from a server by logging in to a target account in advance;
  a token exchange unit, configured to: when the short-distance communication unit determines, based on the short-distance communication identifier, that the second terminal is a trusted device, obtain a second token of the second terminal;
  a token verification unit, configured to verify validity of the second token by using the server, where the second token is applied for by the second terminal from the server by logging in to the target account in advance; and
  a login request unit, configured to: when the verification of the second token succeeds, automatically log in to the target account.

In a possible implementation of the fourth aspect, the short-distance communication unit is specifically configured to: when the short-distance communication identifier is included in a pre-established trusted list, determine that the second terminal is a trusted device.

In a possible implementation of the fourth aspect, the apparatus further includes: a trusted list establishing unit, configured to: before a Bluetooth matching unit obtains the short-distance communication identifier of the second terminal, when the target account is successfully logged in to, add the short-distance communication identifier of the second terminal to the trusted list based on a configuration operation performed by a user, where a short-distance communication connection is established between the second terminal and the first terminal.

In a possible implementation of the fourth aspect, the short-distance communication unit is specifically configured to: obtain the short-distance communication identifier of the second terminal when the first terminal stores a first token and is in a logout state, where the first token is applied for by the first terminal from the server by logging in to the target account in advance.

The login request unit is specifically configured to: when verification of the first token succeeds, automatically log in to the target account.

In a possible implementation of the fourth aspect, the login request unit is further configured to: before the short-distance communication unit obtains the short-distance communication identifier of the second terminal when the first terminal stores a first token and is in a logout state, when the first terminal does not store the first token, send a token obtaining request to the server in a process of logging in to the target account, where the token obtaining request is used to request the server to return the first token when verification of a target account login request of the first terminal succeeds; and receive and store the first token returned by the server.

In a possible implementation of the fourth aspect, the login request unit is further configured to: when it is detected that a user enters an operation of logging out of the target account on the first terminal, perform a logout operation, and clear the first token.

In a possible implementation of the fourth aspect, the short-distance communication unit is further configured to: before the token exchange unit obtains the second token of the second terminal, establish a short-distance communication connection with the second terminal. This may facilitate data transmission between the first terminal and the second terminal.

In a possible implementation of the fourth aspect, the apparatus further includes:

a check unit, configured to: before the token verification unit verify validity of the first token and the second token by using the server, and after the short-distance communication unit establishes a short-distance communication connection with the second terminal, when the short-distance communication unit determines, based on the short-distance communication identifier, that the second terminal is a trusted device, send a check code request to the server, where the check code request carries the first token, and the check code request is used to indicate the server to return a check code when verification of the first token succeeds; after the check code returned by the server is received, send the check code to the second terminal, to indicate the second terminal to send the check code to the server for verification; and determine that the verification of the check code succeeds.

In a possible implementation of the fourth aspect, the check unit is specifically configured to: when a unique account identifier returned by the second terminal is received, determine that the verification of the check code succeeds, where the unique account identifier returned by the second terminal is a unique identifier that is of a logged-in account and that is sent by the second terminal when the verification of the check code succeeds.

The check unit is further configured to: before the token exchange unit obtains the second token of the second terminal, determine that the received unique account identifier is consistent with a unique account identifier of the target account.

In a possible implementation of the fourth aspect, the token exchange unit is specifically configured to: send the first token to the second terminal, to indicate the second terminal to send the first token to the server for validity verification, and indicate the second terminal to return the second token after the verification of the first token succeeds; and when the second token sent by the second terminal is received, indicate the token verification unit to send the second token to the server for validity verification.

In a possible implementation of the fourth aspect, both the first token sent by the first terminal to the second terminal and the second token received from the second terminal undergo encryption processing, both the first token sent by the second terminal to the server and the second token sent by the first terminal to the server undergo decryption processing, and both the encryption processing and the decryption processing are performed based on a predetermined key.

In a possible implementation of the fourth aspect, the key is an asymmetric key.

In a possible implementation of the fourth aspect, the token verification unit is further configured to: periodically send, based on a preset time interval, the second token to the server for verification; when the verification fails, re-obtain a second token from the second terminal, and send the second token to the server for verification; and when the verification of the re-obtained second token fails, indicate the login request unit to perform a logout operation.

According to a fifth aspect, an embodiment of this application provides a login authentication apparatus, applied to a second terminal, and the apparatus includes:

a short-distance communication unit, configured to: respond to a request of the first terminal for obtaining a short-distance communication identifier, and send the short-distance communication identifier to the first terminal;

a token exchange unit, configured to: when a target account is successfully logged in to, receive a first token sent by the first terminal; and a token verification unit, configured to: send the first token to a server for validity verification, where the first token is sent by the first terminal when the first terminal determines, based on the short-distance communication identifier, that the second terminal is a trusted device; and receive a first token verification result returned by the server.

The token exchange unit is further configured to: return a second token to the first terminal when the verification of the first token succeeds, to indicate the first terminal to send the second token to the server for validity verification, and automatically log in to the target account when the verification of the second token succeeds, where the first token is applied for by the first terminal from the server by logging in to the target account in advance, and the second token is applied for by the second terminal from the server by logging in to the target account in advance.

In a possible implementation of the fifth aspect, the apparatus further includes a login request unit, and the login request unit is configured to: before the token exchange unit receives, when the target account is successfully logged in to, the first token sent by the first terminal, when the second terminal does not store the second token, send a token obtaining request to the server in a process of logging in to the target account, where the token obtaining request is used to request the server to return the second token when verification of a target account login request of the second terminal succeeds; and receive and store the second token returned by the server.

In a possible implementation of the fifth aspect, the login request unit is further configured to: when it is detected that a user enters an operation of logging out of the target account on the first terminal, perform a logout operation, and clear the second token.

In a possible implementation of the fifth aspect, the short-distance communication unit is specifically configured to: before the token exchange unit receives the first token sent by the first terminal, establish a short-distance communication connection with the first terminal.

In a possible implementation of the fifth aspect, the apparatus further includes a check unit, and the check unit is configured to: before the token exchange unit receives the first token sent by the first terminal, and after the short-distance communication unit establishes the short-distance communication connection with the first terminal, receive a check code sent by the first terminal, where the check code is requested from the server when the first terminal determines, based on the short-distance communication identifier, that the second terminal is a trusted device; send the check code to the server for verification; receive a check code verification result returned by the server; and determine that the verification of the check code succeeds.

In a possible implementation of the fifth aspect, the check unit is further configured to send a unique account identifier of a logged-in account to the first terminal, so that the first terminal determines that the received unique account identifier is consistent with a unique account identifier of the target account.

In a possible implementation of the fifth aspect, the token verification unit is specifically configured to: receive the first token sent by the first terminal; send the first token to the server for validity verification; receive a first token verification result returned by the server; and when the verification of the first token succeeds, return the second token to the first terminal, to indicate the first terminal to send the second token to the server for validity verification.

According to a sixth aspect, an embodiment of this application provides a login authentication apparatus, applied to a server, and the apparatus includes:
- a check code generation unit, configured to: receive a check code request sent by a first terminal; and return a check code to the first terminal when verification of a first token succeeds, where the check code request carries the first token, the check code request is sent by the first terminal when the first terminal determines that a second terminal is a trusted device, and the first token is applied for by the first terminal from the server by logging in to a target account in advance;
- a check code verification unit, configured to: receive a check code verification request that is sent by the second terminal and that carries a check code; and when verification of the check code succeeds, return a check code verification result to the second terminal, where the check code verification request is sent by the second terminal after the second terminal receives the check code sent by the first terminal; and
- a token verification unit, configured to: receive the first token sent by the second terminal; perform validity verification on the first token, and then return a first token verification result to the second terminal, where the first token is sent by the first terminal to the second terminal when the first terminal determines that the verification of the check code succeeds.

The token verification unit is further configured to: receive a second token sent by the first terminal; perform validity verification on the second token, and then return a second token verification result to the first terminal, so that the first terminal automatically logs in to the target account when the verification of the second token succeeds, where the second token is sent by the first terminal when the first terminal determines that the verification of the first token succeeds, and the second token is applied for by the second terminal from the server by logging in to the target account in advance.

In a possible implementation of the sixth aspect, the apparatus further includes a token generation unit, and the token generation unit is configured to receive a token obtaining request sent by the first terminal; and when verification of a target account login request of the first terminal succeeds, return the first token to the first terminal.

In a possible implementation of the sixth aspect, the token generation unit is further configured to: receive a token obtaining request sent by the second terminal; and when verification of a target account login request of the second terminal succeeds, return the second token to the second terminal.

According to a seventh aspect, an embodiment of this application provides an electronic device, including a memory and a processor, where the memory is configured to store a computer program, and the processor is configured to perform the method according to the first aspect, the second aspect, or the third aspect when the computer program is invoked.

According to an eighth aspect, an embodiment of this application provides a login authentication system, including: a first terminal, a second terminal, and a server, where the first terminal is configured to perform the method according to the first aspect, the second terminal is configured to perform the method according to the second aspect, and the server is configured to perform the method according to the third aspect.

According to a ninth aspect, an embodiment of this application provides a computer-readable storage medium. The computer-readable storage medium stores a computer program, and the computer program is executed by the processor to implement the method according to the first aspect, the second aspect, or the third aspect.

According to a tenth aspect, an embodiment of this application provides a computer program product. When the computer program product runs on an electronic device, the electronic device is enabled to perform the method according to the first aspect, the second aspect, or the third aspect.

It may be understood that, for beneficial effects of the second aspect to the tenth aspect, refer to related descriptions in the first aspect. Details are not described herein again.

BRIEF DESCRIPTION OF DRAWINGS

To describe the technical solutions in embodiments of this application more clearly, the following briefly describes the accompanying drawings required for describing the embodiments or the prior art. It is clearly that the accompanying drawings in the following description show merely some embodiments of this application, and for a person of ordinary skill in the art, other drawings may be obtained according to these drawings without creative efforts.

DESCRIPTION OF EMBODIMENTS

For a technical problem that a current terminal automatic login method entails low security, embodiments of this application provide a login authentication method, apparatus, and system. Before a target account is automatically logged in to, a short-distance communication identifier of a nearby second terminal is used to determine whether the second terminal is a trusted device. Then, when the second terminal is determined to be a trusted device, a server is used to verify validity of a first token that is applied for by a first terminal from the server in advance and a second token that is applied for by the second terminal from the server in advance. The target account is automatically logged in to when verification of both the first token and the second token succeeds. In embodiments of this application, the foregoing technical solutions are used to improve automatic login security of the first terminal.

The following describes the technical solutions of this application in detail by using specific embodiments. The following several specific embodiments may be combined with each other, and a same or similar concept or process may not be described again in some embodiments.

Figure 1:
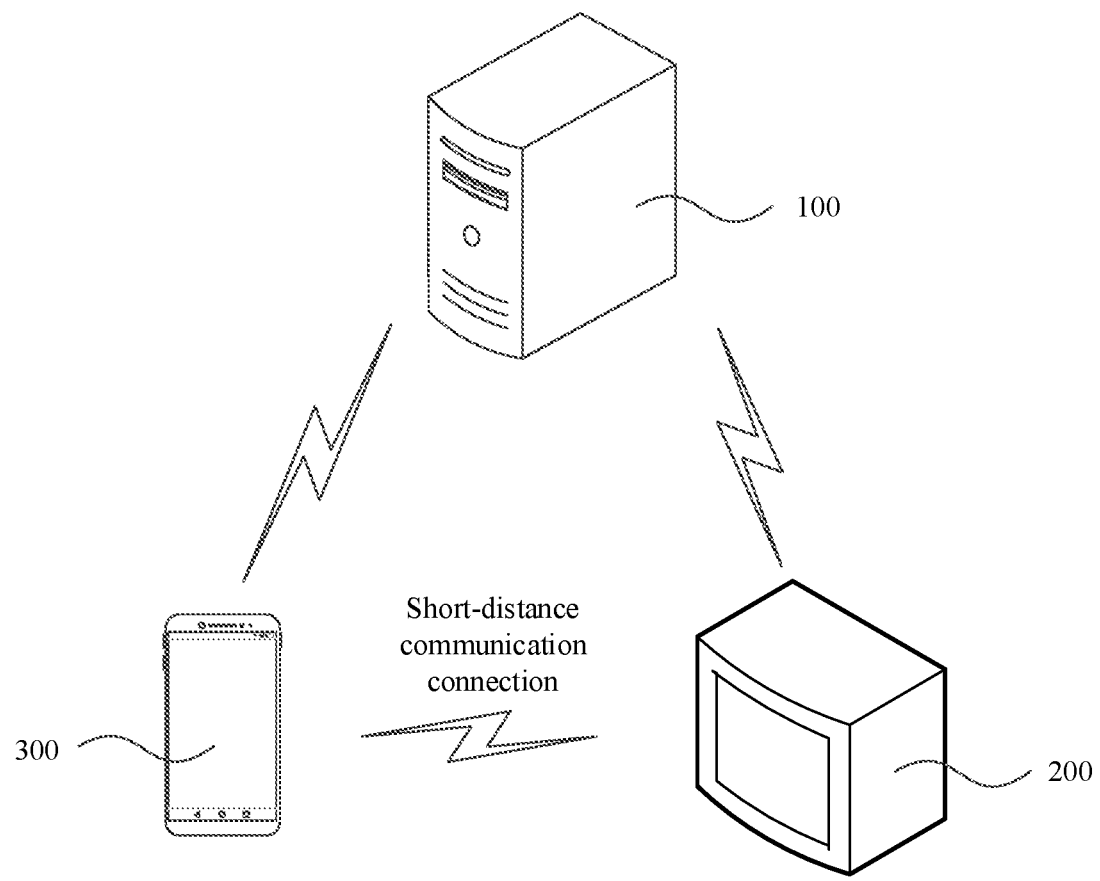
FIG. 1 is a schematic diagram of a structure of a login authentication system according to an embodiment of this application.

FIG. 1 is a schematic diagram of a structure of a login authentication system according to an embodiment of this application. As shown in FIG. 1, the login authentication system provided in this embodiment may include: a server 100 and a terminal device, where the terminal device may include a first terminal 200 and a second terminal 300. The first terminal 200 and the second terminal 300 may register an account in the server 100, and log in to the server 100 by logging in to the account, to obtain a service provided by the server 100. In addition, the first terminal 200 may perform an authentication process of automatic login by using the second terminal 300, to improve automatic login security.

In this embodiment, the terminal device may be a nonportable device such as a vehicle-mounted terminal, a smart television, a smart speaker, or a desktop computer, or may be a portable device such as a tablet computer or a notebook computer. In the figure, an example in which the first terminal 200 is a vehicle-mounted terminal and the second terminal 300 is a mobile phone is used for description. There is at least one first terminal 200 and at least one second terminal 300, and a specific quantity of first terminals 200 and a specific quantity of second terminals 300 are not particularly limited in this embodiment.

It should be noted that, in this embodiment, the first terminal 200 and the second terminal 300 are not strictly distinguished from each other. A same terminal device may be used as the second terminal 300 in some scenarios, or may be used as the first terminal 200 in some other scenarios. For example, in a scenario, a tablet computer may be used to attempt to authenticate an automatic login process of a vehicle-mounted terminal; or in another scenario, a mobile phone may be used to attempt to authenticate an automatic login process of a tablet computer.

In addition, when authentication is performed, the second terminal 300 may be used to attempt to authenticate an automatic login process of the first terminal 200; or the first terminal 200 may be used to attempt to authenticate an automatic login process of the second terminal 300. For example, in a scenario, a mobile phone may be used to attempt to authenticate an automatic login process of a smart speaker; or in another scenario, a smart speaker may be used to attempt to authenticate an automatic login process of a mobile phone. In this embodiment of this application, an example in which the second terminal 300 is used to attempt to authenticate an automatic login process of the first terminal 200 is used for description.

In this embodiment, when logging in to a target account for the first time, the first terminal 200 may submit a user name and a password that are of the target account to the server 100, to request to log in to the target account; or the first terminal 200 may request a quick response code from the server 100, and then prompt a user to scan the quick response code by using another terminal device (for example, the second terminal 300) on which the target account has been logged in to, to authorize the first terminal 200 to log in to the target account on the server 100; or the first terminal 200 may log in to the server 100 in another manner, for example, collecting face information, and submitting the collected face information to the server 100, to request to log in to the target account. A manner in which the first terminal 200 logs in to the server 100 is not particularly limited in this embodiment.

In a process of logging in to the server 100, the first terminal 200 may send a token obtaining request to the server 100, to request the server 100 to return a unique token to the first terminal 200 when the first terminal 200 successfully logs in. The token obtaining request may be sent to the server 100 before the first terminal 200 successfully logs in. For example, the first terminal 200 may submit the token obtaining request to the server 100 when submitting login information (for example, the user name and the password, or the face information); or the first terminal 200 submits the token obtaining request to the server 100 when requesting the quick response code from the server 100. Alternatively, the token obtaining request may be sent to the server 100 after the first terminal 200 successfully logs in. In this embodiment, an example in which the token obtaining request may be sent to the server 100 before the first terminal 200 successfully logs in is used for description. When the first terminal 200 requests, by submitting the login information to the server 100, to log in to the target account, the server 100 may verify the login information submitted by the first terminal 200 after receiving the login information. When the verification fails, a verification result may be returned to the first terminal 200; or when the verification succeeds, a unique token may be generated and returned to the first terminal 200. Simultaneously, the first terminal 200 successfully logs in to the target account. When the first terminal 200 logs in to the target account by using the second terminal 300 to scan the quick response code, after receiving authorization information submitted by the second terminal 300, the server 100 may generate a unique token, and return the unique token to the first terminal 200. Simultaneously, the first terminal 200 successfully logs in to the target account. After receiving the token (referred to as a first token) returned by the server 100, the first terminal 200 may store the first token for subsequent automatic login.

To meet a user requirement and improve user experience, in this embodiment, when the user proactively logs out of the target account, the first terminal 200 may clear the stored first token in addition to performing a logout operation. In this way, the user may log in to another account or disable automatic login of the target account. The user may proactively log out of the target account by entering a related logout operation on the first terminal 200, for example, by tapping an account logout option or entering a voice indication. In addition to clearing the first token, the first terminal 200 may further clear other account information of the target account, for example, the user name and the password, to better protect data privacy of the user.

Based on this, when the user needs to re-log in to the target account, because the first terminal 200 does not store the first token corresponding to the target account in this case, the first terminal 200 may re-request a first token from the server 100 during login and store the re-requested first token, as is similar to the case of the first login to the target account. The re-requested first token may be the same as or different from the first token stored by the first terminal 200 last time. In other words, when the first terminal 200 re-requests a first token, the server 100 may return, to the first terminal 200, the first token previously generated for the first terminal 200; or the server 100 may generate a new first token and return the new first token to the first terminal 200, to reduce a risk generated when the first token is stolen, and improve login security of the first terminal 200.

Similar to the first terminal 200, when the second terminal 300 logs in to the target account for the first time or a user logs in to the target account again after proactively logging out of the target account, that is, when the second terminal 300 does not store a second token, the second terminal 300 may also request a token from the server 100. The server 100 returns a unique token (referred to as a second token) to the second terminal 300 when the second terminal 300 successfully logs in. The second terminal 300 stores the second token after receiving the second token, and may clear the stored second token when the user proactively logs out of the target account. A process in which the second terminal 300 requests a token from the server 100 is similar to a process in which the first terminal 200 requests a token from the server 100. Details are not described herein again.

In this embodiment, after the first terminal 200 successfully logs in to the target account for the first time, the first terminal 200 may establish a trusted list, to determine, based on the trusted list, whether the second terminal 300 is a trusted device. Certainly, the first terminal 200 may alternatively establish a blacklist and a whitelist, and determine, based on the blacklist and the whitelist, whether the second terminal 300 is a trusted device. A manner for establishing a trusted list is convenient. In this embodiment of this application, the trusted list is used as an example for description subsequently.

In a specific implementation, after the first terminal 200 successfully logs in to the target account for the first time, the user may establish a short-distance communication connection between the second terminal 300 and the first terminal 200, and add a short-distance communication identifier of the second terminal 300 to the trusted list of the first terminal 200. Certainly, the first terminal 200 may establish a short-distance communication connection to the second terminal 300 before the first terminal 200 successfully logs in to the target account. In this case, after the first terminal 200 successfully logs in to the target account for the first time, the first terminal 200 may prompt the user whether to add the short-distance communication identifier of the connected second terminal 300 to the trusted list, and then may determine, based on a selection operation of the user, whether to add the short-distance communication identifier. In addition, the first terminal 200 may further provide a record of the second terminal 300 that has established a short-distance communication connection to the first terminal 200, and the user may proactively add the short-distance communication identifier of the selected second terminal 300 to the trusted list based on the record. Certainly, in this embodiment, a trusted list may be established in another manner, and a specific implementation is not particularly limited in this embodiment. In addition, in this embodiment, after the first terminal 200 establishes the trusted list, the user may perform a deletion operation on a short-distance communication identifier in the trusted list.

The short-distance communication connection may be a Bluetooth connection, a near field communication (Near Field Communication, NFC) connection, a Wireless-Fidelity (Wireless-Fidelity, Wi-Fi) connection, a ZigBee (ZigBee) connection, or the like. To improve use convenience of a user, in this embodiment, the Bluetooth connection may be preferably used. A short-distance communication identifier is a unique identifier that is of a terminal device (including the first terminal 200 and the second terminal 300) and that is related to a short-distance communication connection. When the Bluetooth connection is used, the short-distance communication identifier may be correspondingly a Bluetooth media access control (Media Access Control, MAC) address or another unique identifier of a Bluetooth device. For ease of understanding, an example in which the short-distance communication connection is the Bluetooth connection and the short-distance communication identifier is the Bluetooth MAC address is used subsequently for description in this embodiment of this application.

The following describes, by using an example, a process in which the user logs in to the target account on the first terminal 200 and the second terminal 300 and establishes the trusted list.

When the user needs to log in to the target account, the second terminal 300 may provide, for the user, a login interface used for entering a user name and a password. After the user enters the user name and the password that are of the target account on the login interface, the second terminal 300 submits the user name and the password that are entered by the user to the server 100, to log in to the target account. When the user needs to log in to the target account, the first terminal 200 may request a quick response code from the server 100 for display, and prompt the user to scan the quick response code by using another terminal device in a login state for login. The user may scan the quick response code by using the second terminal 300 that has logged in to the target account. After scanning the quick response code, the second terminal 300 may send, to the server 100, authorization information used to authorize the first terminal 200 to log in to the target account, and may provide a login confirmation interface to the user when the server 100 returns authorization confirmation information. After the user confirms login on the login confirmation interface, the second terminal 300 may return login confirmation information to the server 100. After receiving the login confirmation information, the server 100 may return login success information of the target account to the first terminal 200, so that the first terminal 200 successfully logs in to the target account.

Figure 2:
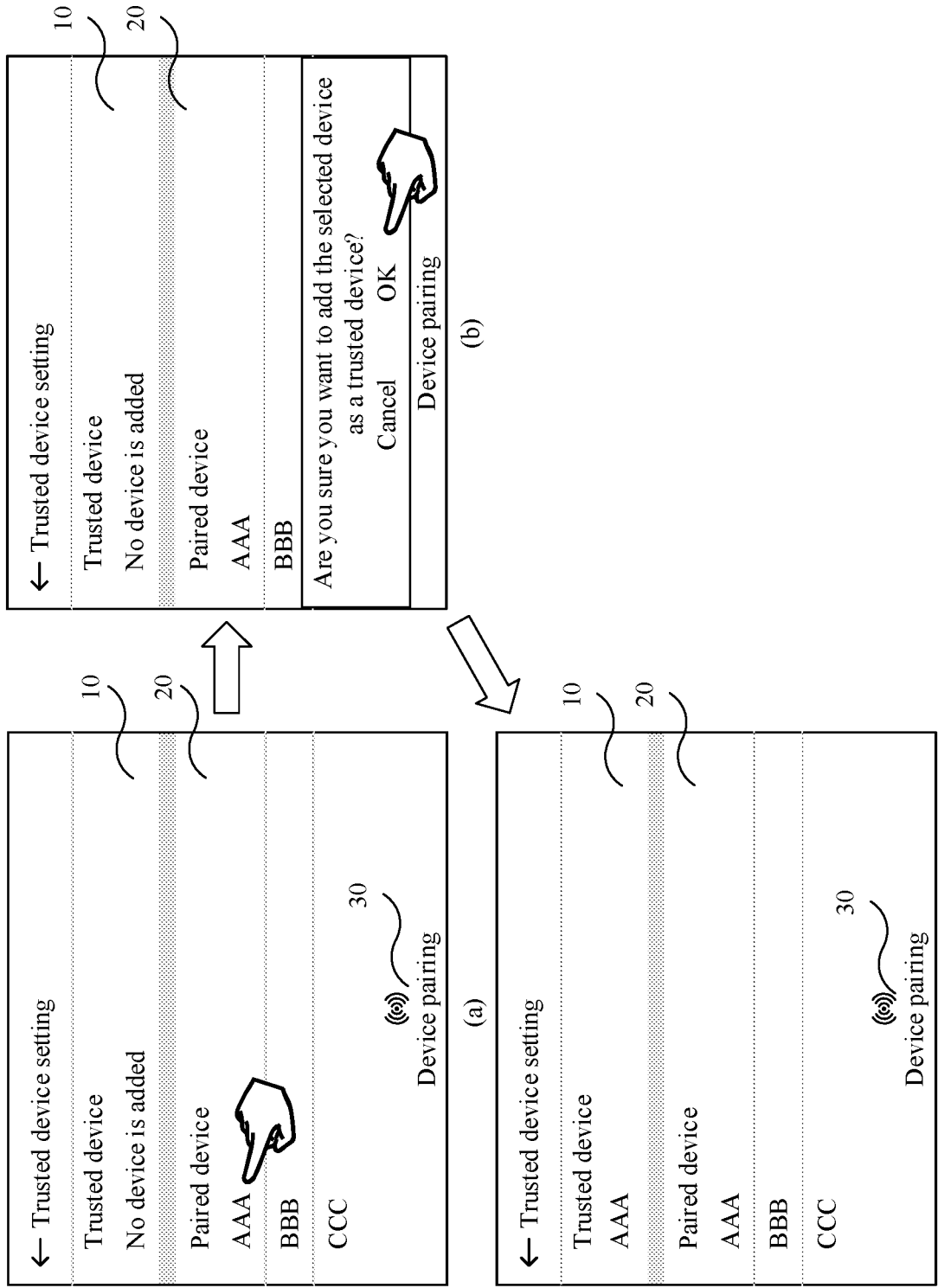
FIG. 2 is a schematic diagram of some trusted device setting interfaces according to an embodiment of this application.

After both the second terminal 300 and the first terminal 200 successfully log in to the target account, the first terminal 200 may provide an option for setting a trusted device. After the user selects the option, the first terminal 200 may provide an interface for setting a trusted device. FIG. 2 is a schematic diagram of some trusted device setting interfaces according to an embodiment of this application. As shown in (a) in FIG. 2, a trusted device setting interface may include a trusted device bar 10, a paired device bar 20, and a device pairing control 30 that is used to establish a Bluetooth connection. The trusted device bar 10 is used to display an added trusted device. When no trusted device is added, prompt information used to indicate that no trusted device is added may be displayed, and may be, for example, prompt information shown in (a) in FIG. 2: "No device is added". The paired device bar 20 is used to display a record of a second terminal 300 that has established a Bluetooth connection to the first terminal 200. For ease of user identification, the paired device bar 20 may specifically display a device identifier of the second terminal 300, for example, "AAA", "BBB", and "CCC" shown in (a) in FIG. 2.

The user may directly select a device identifier in the paired device bar 20 to add a second terminal 300 corresponding to the device identifier as a trusted device, and the first terminal 200 may add a Bluetooth MAC address of the second terminal 300 to the trusted list. For ease of user identification, the first terminal 200 may display a device identifier of a trusted device in the trusted device bar 10, and does not display the trusted list.

When the paired device bar 20 does not include a device identifier of a second terminal 300 (for example, the foregoing second terminal 300 that has successfully logged in to the target account) that the user wants to add as a trusted device, the user may establish a Bluetooth connection to a to-be-added second terminal 300 by selecting the device pairing control 30, to add a device identifier of the second terminal 300 to the paired device bar 20. In a specific implementation, after the user selects the device pairing control 30, the first terminal 200 may jump to a Bluetooth connection interface, and scan a nearby Bluetooth device. When the user enables Bluetooth on a second terminal 300 that has successfully logged in to the target account, the first terminal 200 may detect the second terminal 300 through scanning and perform pairing. After the user confirms pairing information on the second terminal 300 and the first terminal 200, the first terminal 200 may display a device identifier of the successfully paired second terminal 300 in the Bluetooth connection interface, and synchronously display the device identifier in the paired device bar 20. The user may select the device identifier to add the second terminal 300 corresponding to the device identifier as a trusted device. The first terminal 200 correspondingly displays the device identifier in the trusted device bar 10, and adds a Bluetooth MAC address of the second terminal 300 to the trusted list.

In a specific process of adding a trusted device, the first terminal 200 may display, after the user selects a device identifier in the paired device bar 20, prompt information used to prompt the user whether to add a corresponding second terminal 300 as a trusted device. For example, as shown in (a) in FIG. 2, the user performs a selection operation (for example, a tap operation) on a device identifier "AAA" in the paired device bar 20. As shown in (b) in FIG. 2, the first terminal 200 responds to the selection operation, and may display prompt information that "Are you sure you want to add the selected device as a trusted device?". In addition, "Cancel" and "OK" options are provided. After the user selects the "OK" option, as shown in (c) in FIG. 2, the first terminal 200 responds to the selection operation of the user by adding the device identifier "AAA" to the trusted device bar 10 and adding a Bluetooth MAC address of the second terminal 300 corresponding to the device identifier "AAA" to the trusted list.

Figure 3:
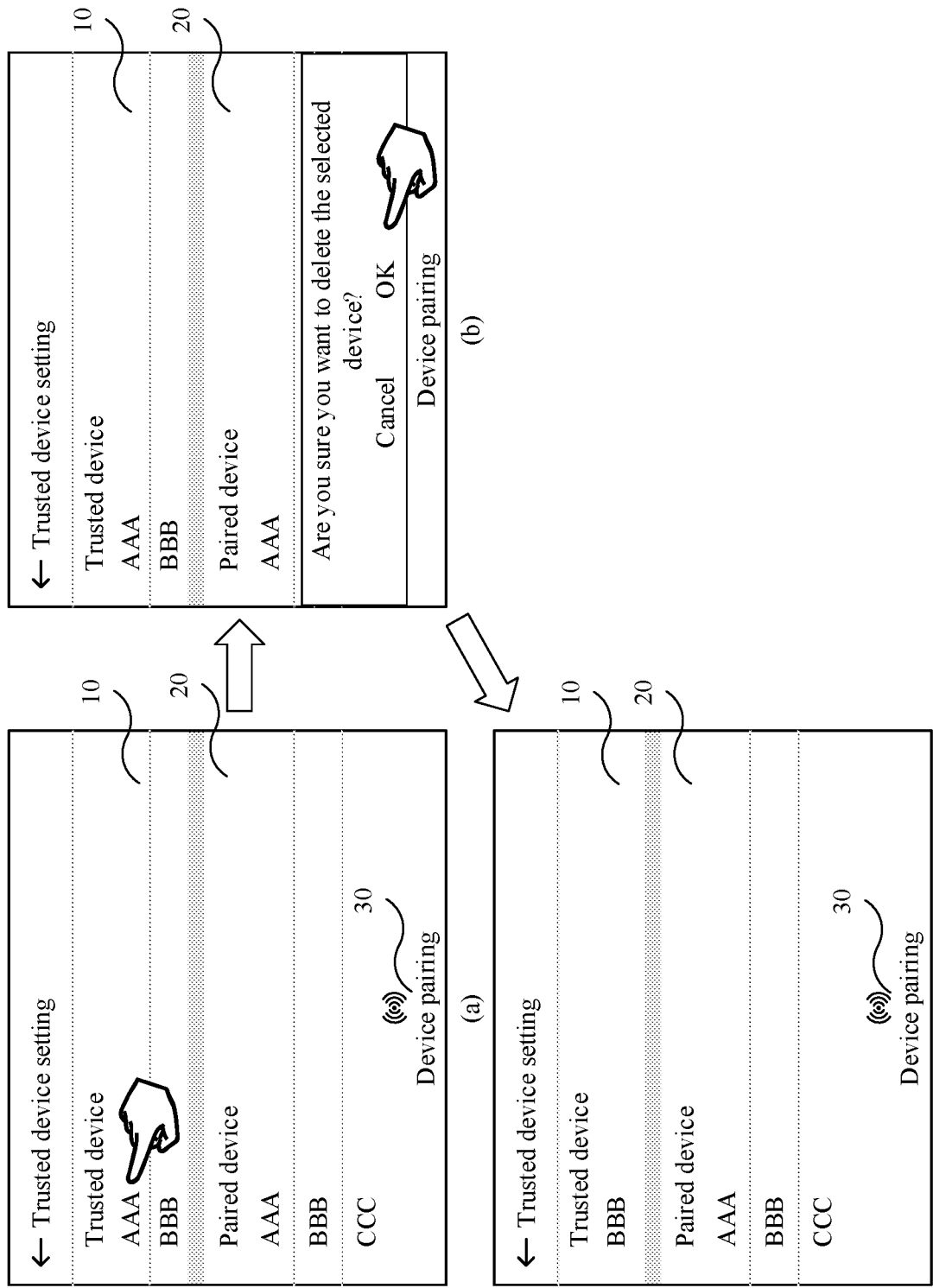
FIG. 3 is a schematic diagram of some other trusted device setting interfaces according to an embodiment of this application.

When the user needs to delete a trusted device, that is, delete a Bluetooth MAC address corresponding to the trusted device in the trusted list, the user may delete a device identifier of the trusted device from the trusted device bar 10. FIG. 3 is a schematic diagram of some other trusted device setting interfaces according to an embodiment of this application. As shown in (a) in FIG. 3, in a specific implementation, the user may perform a selection operation (for example, a tap operation) on the device identifier "AAA" of the to-be-deleted trusted device. As shown in (b) in FIG. 3, the first terminal 200 responds to the selection operation, and may display prompt information that "Are you sure you want to delete the selected device?". In addition, "Cancel" and "OK" options are provided. After the user selects the "OK" option, as shown in (c) in FIG. 3, the first terminal 200 responds to the selection operation of the user by deleting the device identifier "AAA" from the trusted device bar 10 and deleting the Bluetooth MAC address of the second terminal 300 corresponding to the device identifier "AAA" from the trusted list.

In this embodiment, the trusted list may be associated with an account, that is, different accounts in the first terminal 200 correspond to different trusted lists; or the trusted list may not be associated with an account, that is, different accounts in the first terminal 200 correspond to a same trusted list.

In a case in which the trusted list is associated with the account, when the user proactively logs out of the target account, the first terminal 200 may clear the trusted list corresponding to the target account, to better protect data privacy of the user. In this case, when the user logs in to the target account again, the first terminal 200 may re-establish a trusted list corresponding to the target account.

For ease of use by the user, in this embodiment, when the user proactively logs out of the target account or updates the trusted list, the first terminal 200 may alternatively upload the trusted list corresponding to the target account to the server 100 for storage. When the user logs in to the target account again, the first terminal 200 obtains the trusted list corresponding to the target account from the server 100.

In the foregoing process, the first terminal 200 stores the first token and the trusted list, and the second terminal 300 stores the second token. When the first terminal 200 performs automatic login in a case in which the first terminal 200 stores the first token and is in a logout state, when the second terminal 300 is located within a short-distance communication range of the first terminal 200, the first terminal 200 may obtain the short-distance communication identifier of the second terminal 300, and determine, based on the short-distance communication identifier and the trusted list, whether the second terminal 300 is a trusted device. Then, when the second terminal 300 is determined to be a trusted device, the first terminal 200 verifies validity of the first token of the first terminal 200 and the second token of the second terminal 300 by using the server 100, and determines, based on a token verification result, whether to perform automatic login. For a specific implementation process of the automatic login, refer to a subsequent method embodiment. Details are not described herein again.

The following describes in detail an automatic login authentication process of the first terminal.

Figure 4:
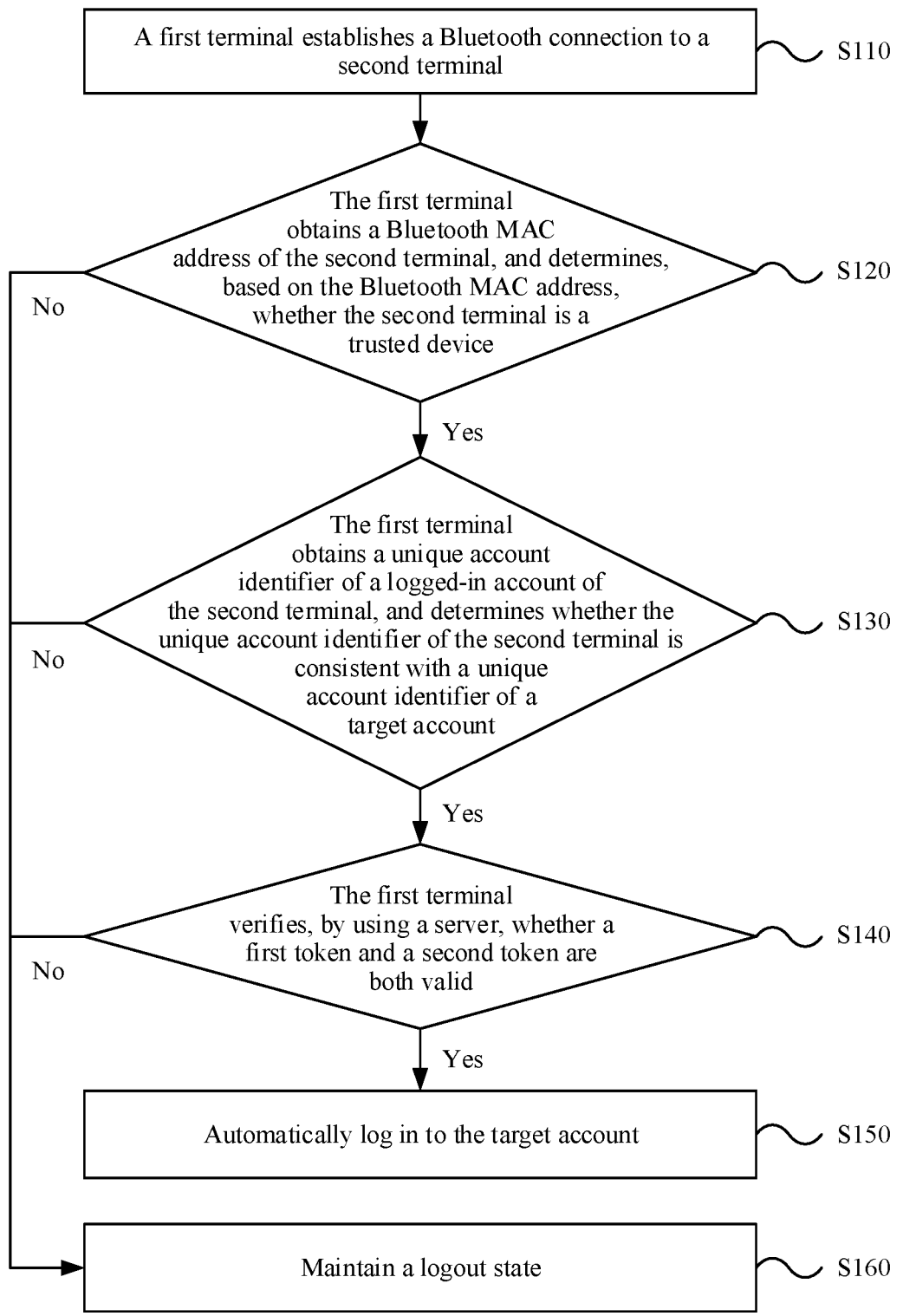
FIG. 4 is a flowchart of a login authentication method according to an embodiment of this application.

FIG. 4 is a flowchart of a login authentication method according to an embodiment of this application. As shown in FIG. 4, the method may include the following steps.

S110: A first terminal establishes a Bluetooth connection to a second terminal.

As described in the foregoing embodiment, the first terminal may obtain a first token and a trusted list by logging in to a target account in advance, and the second terminal may obtain a second token by logging in to the target account in advance. When the first terminal needs to automatically log in to the target account in a case in which the first terminal stores the first token and is in a logout state, the user may move the second terminal close to the first terminal, and the first terminal may perform an authentication process of automatic login based on the trusted list, the first token, and the second token, and determine whether to perform automatic login based on an authentication result.

Specifically, when the second terminal that established a Bluetooth connection to the first terminal moves close to the first terminal, the first terminal may automatically establish a Bluetooth connection to the second terminal based on a Bluetooth connection record. After a connection is established between the two terminals, the two terminals may exchange data by using the established Bluetooth connection.

S120: The first terminal obtains a Bluetooth MAC address of the second terminal, and determines, based on the Bluetooth MAC address, whether the second terminal is a trusted device; and when the second terminal is a trusted device, performs step S130; or when the second terminal is not a trusted device, performs step S160.

Specifically, the first terminal may obtain the Bluetooth MAC address of the second terminal by scanning a Bluetooth broadcast message of the second terminal, or request to obtain the MAC address of the second terminal based on the Bluetooth connection established with the second terminal.

After obtaining the Bluetooth MAC address of the second terminal, the first terminal may check whether the Bluetooth MAC address exists in the trusted list. When the Bluetooth MAC address exists in the trusted list, the second terminal may be considered to be a trusted device, and the first terminal may continue to perform a subsequent authentication process. When the Bluetooth MAC does not exist in the trusted list, it indicates that the authentication fails, and the first terminal may continue to maintain the logout state.

It should be noted that, in this embodiment, the first terminal may alternatively establish a Bluetooth connection to the second terminal when the second terminal is determined to be a trusted device or in a process of verifying whether the second terminal is a trusted device. In other words, there is no strict execution time sequence relationship between step S110 and step S120. Step S110 may be performed before step S120, or may be performed after step S120, or may be performed simultaneously with step S120. This is not specifically limited in this embodiment.

S130: The first terminal obtains a unique account identifier of a logged-in account of the second terminal, and determines whether the unique account identifier of the second terminal is consistent with a unique account identifier of the target account; and when the two unique account identifiers are consistent, performs step S140; or when the two unique account identifiers are inconsistent, performs step S160.

Figure 5:
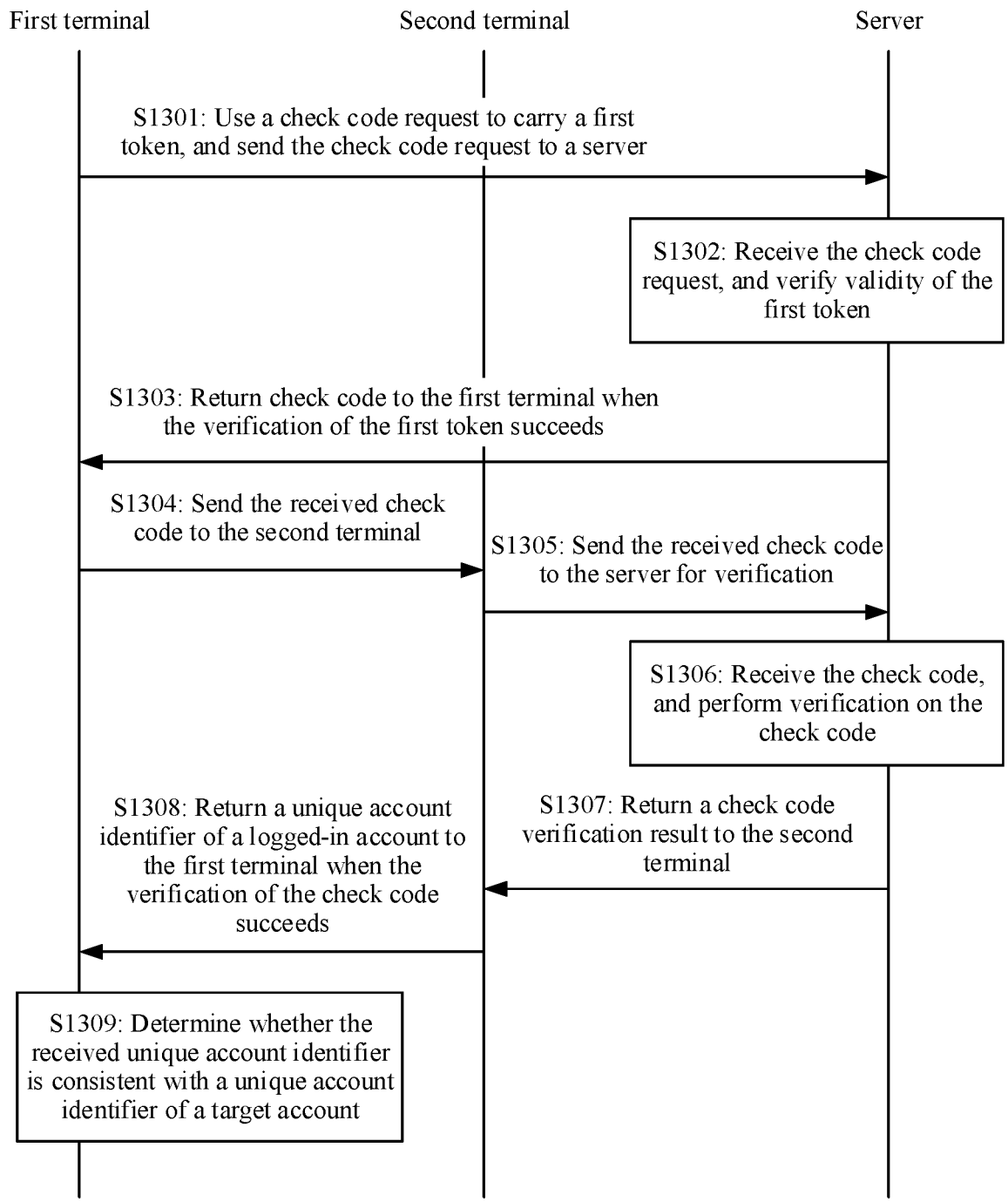
FIG. 5 is a flowchart of an account consistency check method according to an embodiment of this application.

In this embodiment, after determining that the second terminal is a trusted device, the first terminal may perform verification on the first token and the second token by using a server. To further improve automatic login security of the first terminal, in this embodiment, before token verification is performed, the first terminal may first perform consistency check on the logged-in account of the second terminal and the to-be-logged-in target account of the first terminal. In addition, to improve account information security of the second terminal, in this embodiment, before performing account consistency check, the first terminal may first establish trust of the second terminal in the first terminal in a check code verification manner. For a specific verification process, refer to FIG. 5. FIG. 5 is a flowchart of an account consistency check method according to an embodiment of this application. As shown in FIG. 5, the method may include the following steps.

S1301: The first terminal uses a check code request to carry the first token, and sends the check code request to the server.

Specifically, after determining that the second terminal is a trusted device, the first terminal may first send the first token to the server, and request the server to return a check code when verification of the first token succeeds.

S1302: The server receives the check code request, and verifies validity of the first token.

In this embodiment, after receiving the check code request sent by the first terminal, the server may perform verification on the first token carried in the check code request, to determine whether the first token is valid. During specific verification, verification may be performed on a validity period of the first token and other content of the first token.

For example, a token issued by the server includes a header (header), a payload (payload), and a signature (signature), where the header declares an encryption algorithm of the signature; some validity information is stored in the signature, for example, an issue time and/or an expiration time of the token; and the signature is generated by using a secret key (secret) and the encryption algorithm declared in the header to encrypt the header and the payload.

During verification of the first token, the server may first parse out the encryption algorithm from the header of the first token, and then encrypt the header and the payload that are of the first token by using an original secret key and the parsed-out encryption algorithm. A generated signature is compared with the signature in the first token. When the generated signature is consistent with the signature in the first token, it indicates that the first token is valid. In addition, the server may perform verification on the validity period of the first token based on validity information carried in the payload of the first token. When the payload carries the expiration time of the token, the server may directly determine, based on the expiration time, whether the first token expires. When the payload carries only the issue time of the token and does not carry the expiration time, the server may determine, through calculation based on the issue time, whether the first token expires. When the verification on both the signature and the validity period of the first token succeeds, it may be determined that the verification on the first token succeeds.

Certainly, the foregoing is merely an example for describing a token verification method, and is not intended to limit this application. In this embodiment of this application, another token verification method may alternatively be used to verify the first token. This is not particularly limited in this embodiment.

S1303: The server returns a check code to the first terminal when the verification of the first token succeeds.

Specifically, after the verification of the first token succeeds, the server may generate a one-time check code with a short validity period, and return the check code to the first terminal.

When the verification of the first token fails, the server may return a check code verification failure message to the first terminal, and the first terminal may prompt the user to re-log in to the target account on the first terminal to re-apply for a first token.

S1304: The first terminal sends the received check code to the second terminal.

Specifically, after receiving the check code returned by the server, the first terminal may send the check code to the second terminal by using the Bluetooth connection.

S1305: The second terminal sends the received check code to the server for verification.

Specifically, after receiving the check code sent by the first terminal, the second terminal may send the check code to the server, to request the server to verify whether the check code is valid.

S1306: The server receives the check code, and performs verification on the check code.

In this embodiment, after receiving the check code sent by the second terminal, the server may perform verification on the check code. For a specific verification method, various current check code verification methods may be used. This is not particularly limited in this embodiment.

S1307: The server returns a check code verification result to the second terminal.

Specifically, after completing verification on the check code, the server may send the check code verification result to the second terminal, to notify the second terminal of whether the verification of the check code succeeds.

S1308: The second terminal returns the unique account identifier of the logged-in account to the first terminal when the verification of the check code succeeds.

In this embodiment, after receiving the check code verification result returned by the server, the second terminal may learn whether the verification of the check code succeeds. When the verification of the check code succeeds, the unique account identifier of the logged-in account may be sent to the first terminal; or when the verification of the check code fails, a check code verification failure message may be returned to the first terminal, to notify the first terminal that the verification of the check code fails. The second terminal may alternatively not return any message when the verification of the check code fails, and when the first terminal does not receive, within a preset time period, a message returned by the second terminal, the first terminal may consider that the verification of the check code fails. When the first terminal determines that the verification of the check code fails, the first terminal may continue to maintain the logout state, or may request a check code again for authentication or perform another operation.

In addition, in this embodiment, a subsequent account consistency check step may not be performed. In this case, the second terminal may alternatively return, to the first terminal when the verification of the check code succeeds, a check code verification success message that does not carry the unique account identifier, to notify the first terminal that the check code verification succeeds.

The unique account identifier may be a user identity (Identity, ID) number, or may be another unique identifier of the account.

S1309: The first terminal determines whether the received unique account identifier is consistent with the unique account identifier of the target account.

Specifically, after receiving the unique account identifier sent by the second terminal, the first terminal may compare the unique account identifier with the unique account identifier of the to-be-logged-in target account to determine whether the two are consistent, that is, determine whether the logged-in account of the second terminal is consistent with the to-be-logged-in account of the first terminal. If the two accounts are consistent, a subsequent authentication process may continue; or if the two accounts are inconsistent, it indicates that the authentication fails, and the first terminal may continue to maintain the logout state.

For the unique account identifier of the target account, the first terminal may store the unique account identifier of the target account when pre-applying for and storing the first token, and read the stored unique account identifier of the target account during comparison. Alternatively, before performing the comparison, the first terminal may send the first token to the server to request the unique account identifier of the target account, and then perform the comparison.

S140: The first terminal verifies, by using the server, whether the first token and the second token are both valid; and when the first token and the second token are both valid, step S150 is performed; otherwise, step S160 is performed.

Specifically, after the account consistency check succeeds, the first terminal may verify validity of the first token and the second token by using the server. In a specific implementation, at least the following three manners may be used for implementation.

Manner 1: The first terminal and the second terminal exchange tokens, and separately send the token to the server for validity verification.

Specifically, in this implementation, the first terminal may first send the first token to the second terminal, to further establish trust of the second terminal in the first terminal. After receiving the first token, the second terminal sends the first token to the server for validity verification, and sends the second token to the first terminal when the verification succeeds. After receiving the second token, the first terminal sends the second token to the server for validity verification. When the verification succeeds, it may be considered that automatic login authentication succeeds, and the first terminal performs automatic login. When the verification fails, it indicates that the second terminal is not reliable enough, and the first terminal may continue to maintain the logout state.

Manner 2: The first terminal obtains the second token from the second terminal, and sends the first token and the second token to the server for validity verification.

Specifically, in this implementation, the first terminal may send a token obtaining request to the second terminal, to request the second terminal to send the second token to the first terminal. After receiving the second token, the first terminal may send the first token and the second token together to the server for validity verification, and then determine, based on a token verification result returned by the server, whether to perform automatic login.

When the first terminal has performed a process of requesting a check code by using the first token, during token verification, the first terminal may alternatively send only the second token to the server for validity verification.

Manner 3: The first terminal sends the first token to the second terminal, and the second terminal sends the first token and the second token to the server for validity verification.

Specifically, in this implementation, the first terminal may send the first token to the second terminal, and the second terminal sends the first token and the second token together to the server for validity verification. After receiving a verification result returned by the server, the second terminal forwards the verification result to the first terminal.

Among the foregoing three token verification manners, in the first token verification manner, the second terminal and the first terminal perform mutual authentication, and security is higher.

To improve security of data exchange between the first terminal and the second terminal, in this embodiment, encryption processing may be performed during data transmission between the first terminal and the second terminal. An encryption manner may be a symmetric encryption manner, or may be an asymmetric encryption manner, to further improve data exchange security.

The following describes a specific implementation process of token verification by using an example in which the token verification manner is the first token verification manner and the encryption manner is the asymmetric encryption manner.

Figure 6A:
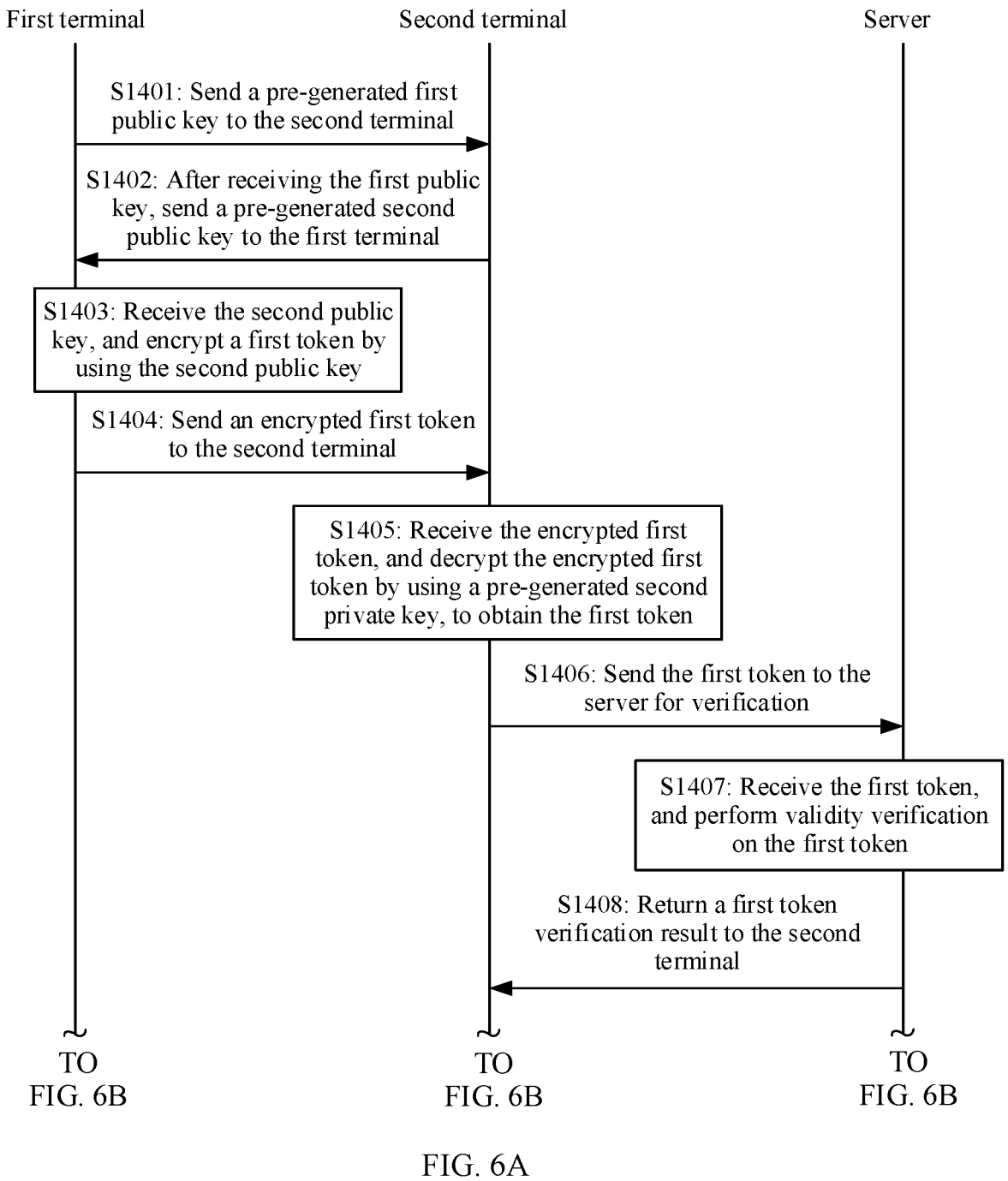
FIG. 6A and FIG. 6B are a flowchart of a token verification method according to an embodiment of this application.
Figure 6B:
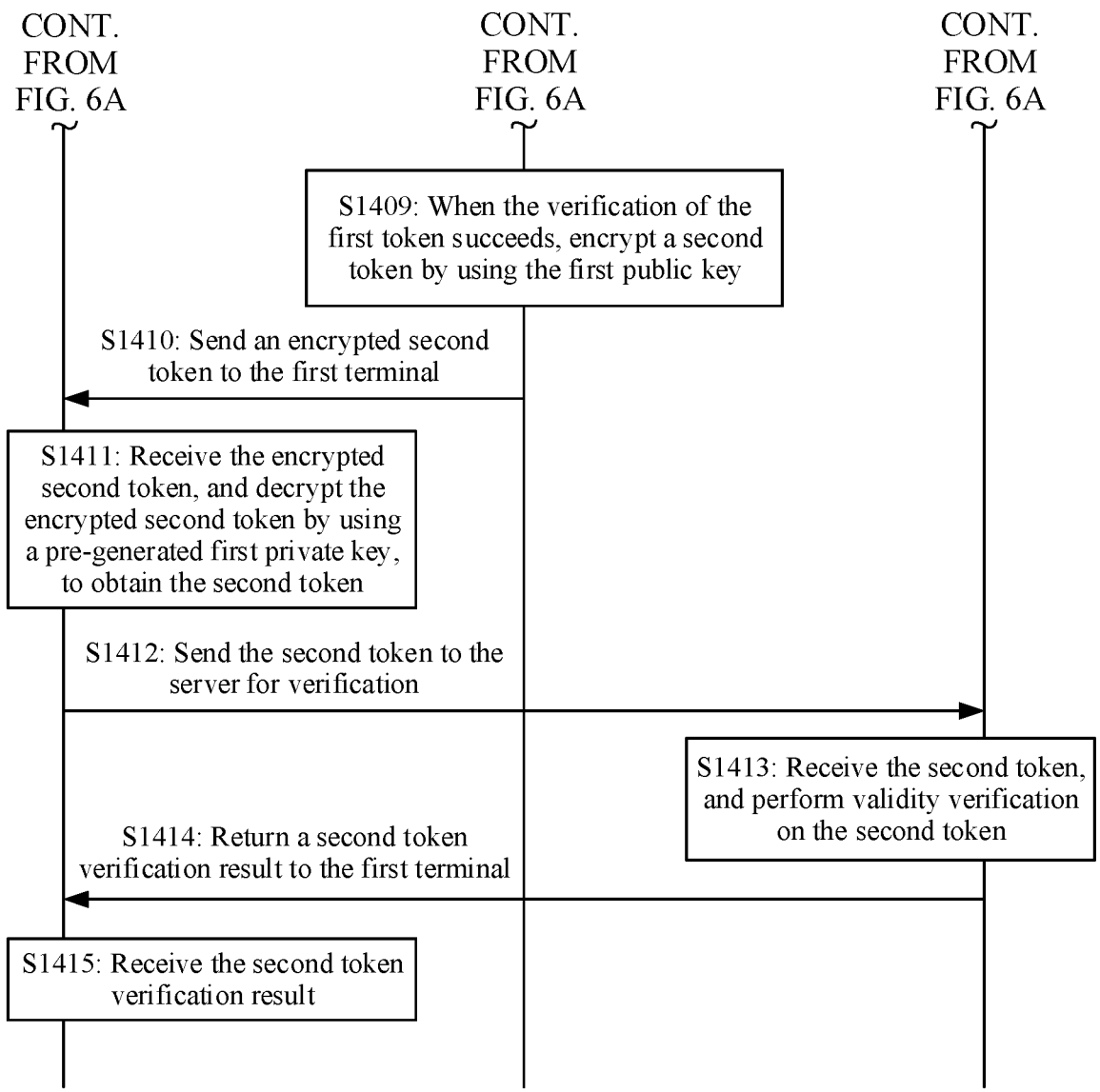

FIG. 6A and FIG. 6B are a flowchart of a token verification method according to an embodiment of this application. As shown in FIG. 6A and FIG. 6B, the method may include the following steps.

S1401: The first terminal sends a pre-generated first public key to the second terminal.

Specifically, the first terminal may generate a secret key pair in advance by using an asymmetric encryption algorithm. The secret key pair includes the first public key and a first private key, where information encrypted by using the first public key needs to be decrypted by using the first private key. The secret key pair may be generated by the first terminal in an authentication process of current automatic login (before the first private key is sent), that is, a different secret key pair may be used for each automatic login; or the secret key pair may be generated by the first terminal before the first terminal performs automatic login to the target account for the first time or in an authentication process of performing automatic login to the target account for the first time, that is, a same secret key pair may be used for each automatic login.

Similarly, the second terminal may also generate a secret key pair in advance by using the asymmetric encryption algorithm. The secret key pair includes a second public key and a second private key, where information encrypted by using the second public key needs to be decrypted by using the second private key. A manner in which the second terminal generates a secret key pair is similar to a manner in which the first terminal generates a secret key pair. Details are not described herein again.

After the account consistency check succeeds, the first terminal and the second terminal may exchange public keys. In other words, keys are agreed on, so that during data exchange, the first terminal and the second terminal encrypt and decrypt the exchanged data by using the agreed keys. In a specific implementation, the first terminal may first send the first public key to the second terminal, and request the second public key from the second terminal.

S1402: After receiving the first public key, the second terminal sends the pre-generated second public key to the first terminal.

S1403: The first terminal receives the second public key, and encrypts the first token by using the second public key.

Specifically, after receiving the second public key sent by the second terminal, the first terminal may encrypt the first token by using the second public key, and then send an encrypted first token to the second terminal, to further establish trust of the second terminal in the first terminal, so that the second terminal feeds back the second token to the first terminal when the second terminal determines that the first terminal is trusted.

S1404: The first terminal sends the encrypted first token to the second terminal.

S1405: The second terminal receives the encrypted first token, and decrypts the encrypted first token by using the pre-generated second private key, to obtain the first token.

Specifically, after receiving encrypted data (that is, the encrypted first token) sent by the first terminal, the second terminal may decrypt the encrypted data by using the second private key corresponding to the second public key, to obtain the first token.

S1406: The second terminal sends the first token to the server for verification.

In this embodiment, after obtaining the first token through decryption, the second terminal may send the first token to the server, to request the server to verify whether the first token is valid, to confirm whether the first terminal is trusted.

S1407: The server receives the first token, and performs validity verification on the first token.

Specifically, after receiving the first token, the server may respond to a request of the second terminal and perform verification on the first token. A specific verification process is similar to step S1302. Details are not described herein again.

S1408: The server returns a first token verification result to the second terminal.

S1409: When the verification of the first token succeeds, the second terminal encrypts the second token by using the first public key.

Specifically, after receiving the first token verification result returned by the server, the second terminal may determine whether the verification of the first token succeeds. When the verification of the first token succeeds, the second token may be sent to the first terminal after being encrypted by using the first public key, to further establish trust of the first terminal in the second terminal. When the verification of the first token fails, similar to step S1308, a first token verification failure message may be returned to the first terminal or no message is returned, to notify the first terminal that the verification of the first token fails. When determining that the verification of the first token fails, the first terminal may continue to maintain the logout state; or the first terminal may prompt the user to re-log in to the target account to apply for a new first token or perform another operation.

S1410: The second terminal sends an encrypted second token to the first terminal.

S1411: The first terminal receives the encrypted second token, and decrypts the encrypted second token by using the pre-generated first private key, to obtain the second token.

Specifically, after receiving encrypted data (that is, the encrypted second token) sent by the second terminal, the first terminal may decrypt the encrypted data by using the first private key corresponding to the first public key, to obtain the second token.

S1412: The first terminal sends the second token to the server for verification.

In this embodiment, after obtaining the second token through decryption, the first terminal may send the second token to the server, to request the server to verify whether the second token is valid, to further determine whether the second terminal is trusted.

S1413: The server receives the second token, and performs validity verification on the second token.

Specifically, after receiving the second token, the server may respond to a request of the first terminal and perform verification on the second token. A specific verification process is similar to the verification process of the first token. Details are not described herein again.

S1414: The server returns a second token verification result to the first terminal.

S1415: The first terminal receives the second token verification result.

In this embodiment, after receiving the second token verification result returned by the server, the first terminal may determine whether the verification of the second token succeeds. When the verification succeeds, the first terminal may determine that the second terminal is trusted, and perform an automatic login operation. When the verification fails, the first terminal may continue to maintain the logout state.

S150: Automatically log in to the target account.

Specifically, after the verification of both the first token and the second token succeeds, the first terminal may perform an operation of automatically logging in to the target account, and enter a login state from the logout state.

S160: Maintain the logout state.

Specifically, when information verification fails in the automatic login authentication process of the target account, the first terminal may consider that the authentication fails and continue to maintain the logout state.

To further improve automatic login security of the first terminal, in this embodiment, after the first terminal automatically logs in to the target account, the first terminal may send the first token of the second terminal to the server every preset time interval (for example, five minutes) for verification. When the verification succeeds, the first terminal continues to maintain the login state. When the verification fails, the first terminal may re-obtain a second token from the second terminal, and send the second token to the server for verification. When the verification succeeds, the first terminal continues to maintain the login state. When the verification still fails, the first terminal may perform a logout operation.

When re-obtaining the second token, the first terminal may alternatively send the first token to the second terminal, to indicate the second terminal to return the second token when verification of the first token succeeds.

According to the login authentication method provided in this embodiment, before automatically logging in to the target account, the first terminal first determines, based on a short-range communication identifier of the nearby second terminal, whether the second terminal is a trusted device. Then, when determining that the second terminal is a trusted device, the first terminal checks consistency between the logged-in account of the second terminal and the target account. When the two accounts are consistent, the first terminal verifies, by using the server, validity of the first token pre-applied for by the first terminal from the server and validity of the second token pre-applied for by the second terminal from the server. When the verification of both the first token and the second token succeeds, the first terminal automatically logs in to the target account. In this way, automatic login security of the first terminal can be effectively improved.

Based on a same inventive concept, to implement the foregoing method, an embodiment of this application provides a login authentication apparatus. The apparatus embodiment corresponds to the foregoing method embodiment. For ease of reading, details in the foregoing method embodiment are not described one by one in this apparatus embodiment. However, it should be clarified that the apparatus in this embodiment can correspondingly implement all content in the foregoing method embodiment.

Figure 7:
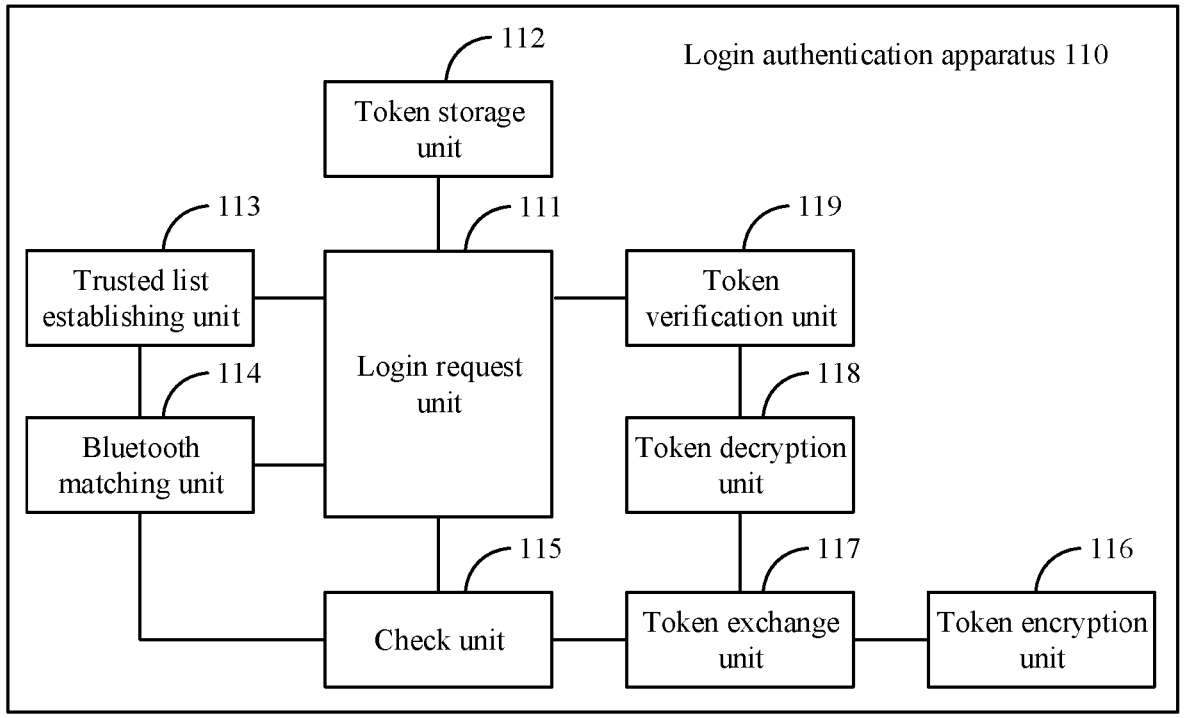
FIG. 7 is a schematic diagram of a structure of a login authentication apparatus according to an embodiment of this application.

FIG. 7 is a schematic diagram of a structure of a login authentication apparatus according to an embodiment of this application. As shown in FIG. 7, the login authentication apparatus 110 provided in this embodiment may include: a login request unit 111, a token storage unit 112, a trusted list establishing unit 113, a Bluetooth matching unit 114, a check unit 115, a token encryption unit 116, a token exchange unit 117, a token decryption unit 118, and a token verification unit 119.

The login request unit 111 is configured to support the first terminal in performing the login process performed when the first token is not stored in the foregoing embodiment, S150, S160, and/or another process of the technology described in this specification.

The token storage unit 112 is configured to support the first terminal in storing the first token delivered by the server.

The trusted list establishing unit 113 is configured to support the first terminal in executing the process of establishing a trusted list in the foregoing embodiment, storing the trusted list, and/or another process of the technology described in this specification.

The Bluetooth matching unit 114 is configured to support the first terminal in performing the operation of establishing the Bluetooth connection to the second terminal in S110 in the foregoing embodiment, S120, and/or another process of the technology described in this specification.

The check unit 115 is configured to support the first terminal in performing S1301, S1304, and S1309 that are in the foregoing embodiment, and/or another process of the technology described in this specification.

The token encryption unit 116 is configured to support the first terminal in performing S1403 in the foregoing embodiment and/or another process of the technology described in this specification.

The token exchange unit 117 is configured to support the first terminal in performing S1401 and S1404 that are in the foregoing embodiment and/or another process of the technology described in this specification.

The token decryption unit 118 is configured to support the first terminal in performing S1411 in the foregoing embodiment and/or another process of the technology described in this specification.

The token verification unit 119 is configured to support the first terminal in performing S1412 and S1415 that are in the foregoing embodiment and/or another process of the technology described in this specification.

The login authentication apparatus provided in this embodiment may perform the method performed by the first terminal in the foregoing method embodiment. An implementation principle and technical effects in this embodiment are similar to those in the method embodiment, and details are not described herein again.

Figure 8:
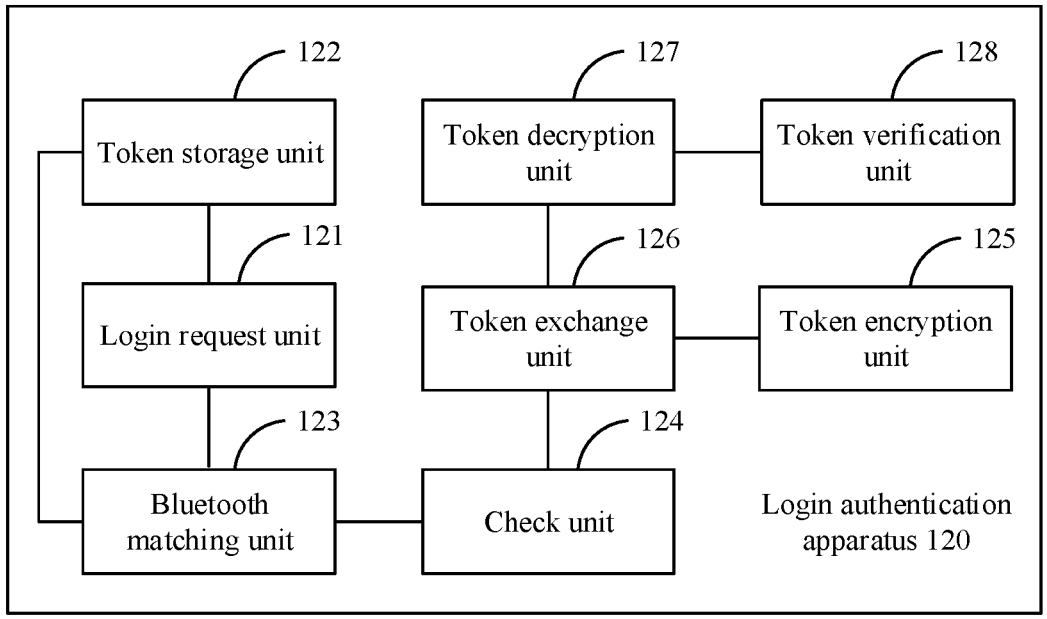
FIG. 8 is a schematic diagram of a structure of another login authentication apparatus according to an embodiment of this application.

FIG. 8 is a schematic diagram of a structure of another login authentication apparatus according to an embodiment of this application. As shown in FIG. 8, a login authentication apparatus 120 provided in this embodiment may include: a login request unit 121, a token storage unit 122, a Bluetooth matching unit 123, a check unit 124, a token encryption unit 125, a token exchange unit 126, a token decryption unit 127, and a token verification unit 128.

The login request unit 121 is configured to support the second terminal in performing the login process performed when the second token is not stored in the foregoing embodiment and/or another process of the technology described in this specification.

The token storage unit 122 is configured to support the second terminal in storing the second token delivered by the server.

The Bluetooth matching unit 123 is configured to support the second terminal in performing the operation of establishing the Bluetooth connection to the first terminal in S110 in the foregoing embodiment and/or another process of the technology described in this specification.

The check unit 124 is configured to support the second terminal in performing S1305 and S1308 that are in the foregoing embodiment, and/or another process of the technology described in this specification.

The token encryption unit 125 is configured to support the second terminal in performing S1409 in the foregoing embodiment and/or another process of the technology described in this specification.

The token exchange unit 126 is configured to support the second terminal in performing S1402 and S1410 that are in the foregoing embodiment and/or another process of the technology described in this specification.

The token decryption unit 127 is configured to support the second terminal in performing S1405 in the foregoing embodiment and/or another process of the technology described in this specification.

The token verification unit 128 is configured to support the second terminal in performing the operation of determining whether the verification of the first token succeeds in S1406 and S1409 that are in the foregoing embodiment, and/or another process of the technology described in this specification.

The login authentication apparatus provided in this embodiment may perform the method performed by the second terminal in the foregoing method embodiment. An implementation principle and technical effects in this embodiment are similar to those in the method embodiment, and details are not described herein again.

Figure 9:
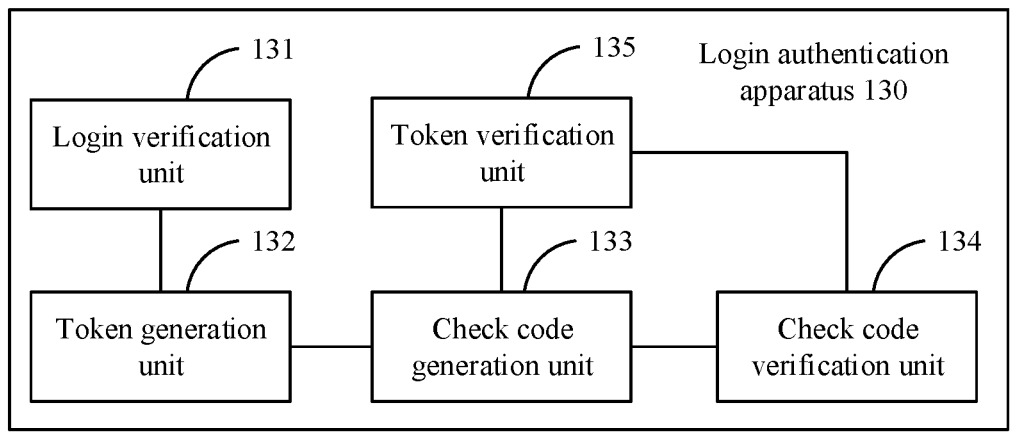
FIG. 9 is a schematic diagram of a structure of still another login authentication apparatus according to an embodiment of this application.

FIG. 9 is a schematic diagram of a structure of still another login authentication apparatus according to an embodiment of this application. As shown in FIG. 9, a login authentication apparatus 130 provided in this embodiment may include a login verification unit 131, a token generation unit 132, a check code generation unit 133, a check code verification unit 134, and a token verification unit 135.

The login verification unit 131 is configured to support the server in performing the verification process in the foregoing embodiment, and in the verification process, the terminal device logs in when the first token is not stored.

The token generation unit 132 is configured to support the server in performing the related process in which the first token and the second token are generated in the foregoing embodiment, and/or another process of the technology described in this specification.

The check code generation unit 133 is configured to support the server in performing the operation of receiving the check code request in S1302 in the foregoing embodiment, S1303, and/or another process of the technology described in this specification.

The check code verification unit 134 is configured to support the server in performing S1306 and S1307 that are in the foregoing embodiment, and/or another process of the technology described in this specification.

The token verification unit 135 is configured to support the server in performing the operation of verifying validity of the first token in S1302 in the foregoing embodiment, S1407, S1408, S1413, S1414, and/or another process of the technology described in this specification.

The login authentication apparatus provided in this embodiment may perform the method performed by the server in the foregoing method embodiment. An implementation principle and technical effects in this embodiment are similar to those in the method embodiment, and details are not described herein again.

It may be clearly understood by a person skilled in the art that, for the purpose of convenient and brief description, division of the foregoing functional units and modules is merely used as an example for description. In actual application, the foregoing functions may be allocated to different functional units and modules for implementation based on a requirement. In other words, an internal structure of the apparatus is divided into different functional units or modules, to implement all or some of the functions described above. Functional units and modules in the embodiments may be integrated into one processing unit, or each unit may exist alone physically, or two or more units are integrated into one unit. The integrated unit may be implemented in a form of hardware, or may be implemented in a form of a software functional unit. In addition, specific names of the functional units and modules are merely used for distinguishing between each other, but are not intended to limit the protection scope of this application. For a specific working process of the units and modules in the foregoing system, refer to a corresponding process in the foregoing method embodiment. Details are not described herein again.

Figure 10:
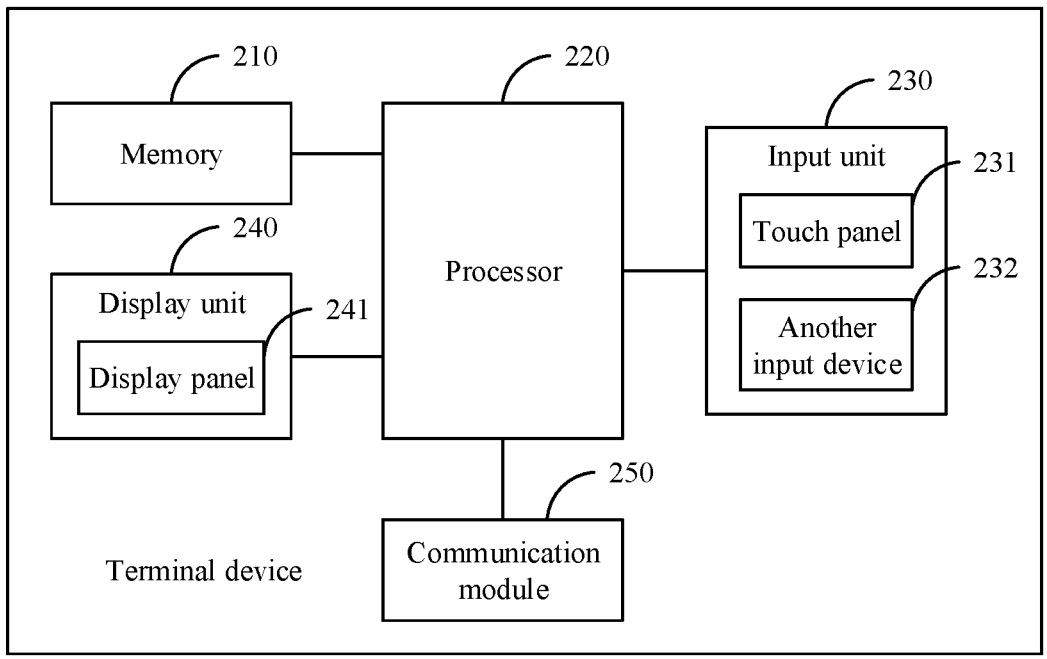
FIG. 10 is a schematic diagram of a structure of a terminal device according to an embodiment of this application.

Based on a same inventive concept, an embodiment of this application further provides a terminal device. FIG. 10 is a schematic diagram of a structure of a terminal device according to an embodiment of this application. As shown in FIG. 10, the terminal device provided in this embodiment may include components such as a memory 210, a processor 220, an input unit 230, a display unit 240, and a communication module 250.

The following specifically describes each component of the terminal device with reference to FIG. 10.

The memory 210 may be configured to store a computer program and a module. The processor 220 may perform, by running the computer program and the module that are stored in the memory 210, the method performed by the first terminal and/or the second terminal in the foregoing method embodiment. The memory 210 may mainly include a program storage area and a data storage area. The program storage area may store an operating system, an application program required by at least one function (such as a sound playback function and an image playback function), and the like. The data storage area may store data (such as audio data and a phone book) created based on use of the terminal device, and the like. In addition, the memory 210 may include a high-speed random access memory, and may further include a non-volatile memory, for example, at least one magnetic disk storage device, a flash memory device, or another volatile solid-state storage device.

The processor 220 is a control center of the terminal device, and is connected to all parts of the entire terminal device by using various interfaces and lines. The processor 220 performs various functions of the terminal device and data processing by running or executing a software program and/or a module stored in the memory 210 and invoking data stored in the memory 210. In this way, overall monitoring is performed on the terminal device. Optionally, the processor 220 may include one or more processing units.

The input unit 230 may be configured to receive input digit or character information, and generate key signal input related to user setting and function control of the terminal device. A user may input account information on the terminal device to log in to an account by using the input unit 230. When the terminal device is used as a first terminal, the user may also set a trusted list by using the input unit 230.

Specifically, the input unit 230 may include a touch panel 231 and another input device 232. The touch panel 231, also referred to as a touchscreen, may collect a touch operation performed by a user on or near the touch panel 231 (for example, an operation performed by the user on or near the touch panel 231 by using any proper object or accessory such as a finger or a stylus), and drive a corresponding connection apparatus based on a preset program. Optionally, the touch panel 231 may include two parts: a touch detection apparatus and a touch controller. The touch detection apparatus detects a touch position of the user, detects a signal brought by a touch operation, and transmits the signal to the touch controller. The touch controller receives touch information from the touch detection apparatus, converts the touch information into touch point coordinates, and then sends the touch point coordinates to the processor 220. The touch controller can also receive and execute a command sent by the processor 220. In addition, the touch panel 231 may be implemented in a plurality of types such as a resistive type, a capacitive type, an infrared type, and a surface acoustic wave type. In addition to the touch panel 231, the input unit 230 may further include the another input device 232. Specifically, the another input device 232 may include but is not limited to one or more of a physical keyboard, a function button (such as a volume control button or an on/off button), a trackball, a mouse, a joystick, and the like.

The display unit 240 may be configured to display information input by the user or information provided for the user, and various menus of the terminal device. In this embodiment, the terminal device may display, by using the display unit 240, an account login interface for the user to log in to the account. When the terminal device is used as the first terminal, the terminal device may also display, by using the display unit 240, a setting interface for the user to set a trusted list.

Specifically, the display unit 240 may include a display panel 241. Optionally, the display panel 241 may be configured in a form of a liquid crystal display (Liquid Crystal Display, LCD), an organic light-emitting diode (Organic Light-Emitting Diode, OLED), or the like. Further, the touch panel 231 may cover the display panel 241. After detecting a touch operation on or near the touch panel 231, the touch panel 231 transmits the touch operation to the processor 220 to determine a type of the touch event, and then, the processor 220 provides corresponding visual output on the display panel 241 based on the type of the touch event. In FIG. 8, the touch panel 231 and the display panel 241 are used as two independent components to implement input and input functions of the terminal device. However, in some embodiments, the touch panel 231 and the display panel 241 may be integrated to implement the input and output functions of the terminal device.

The communication module 250 may provide a solution that is applied to the terminal device and that includes a wireless local area network (Wireless Local Area Network, WLAN) (for example, a Wi-Fi network), Bluetooth, ZigBee, a mobile communication network, a global navigation satellite system (global navigation satellite system, GNSS), frequency modulation (frequency modulation, FM), NFC, and an infrared (infrared, IR) technology. A communication module may be one or more components integrating at least one communication processing module. The communication module 250 may include an antenna, and may receive an electromagnetic wave by using the antenna, perform frequency modulation and filtering processing on an electromagnetic wave signal, and send a processed signal to the processor. The communication module 250 may further receive a to-be-sent signal from the processor 220, perform frequency modulation and amplification on the signal, and convert, by using the antenna, the signal into an electromagnetic wave for radiation. The terminal device may establish, by using the communication module 250, a short-distance communication connection to another terminal device and communicate with the server.

A person skilled in the art may understand that FIG. 10 is merely an example of a terminal device, and constitutes no limitation on the terminal device. The terminal device may include more or fewer components than those shown in the figure, or combine some components, or have different component arrangements.

The terminal device provided in this embodiment may perform the foregoing method embodiment. An implementation principle and technical effects in this embodiment are similar to those in the method embodiment, and details are not described herein again.

Figure 11:
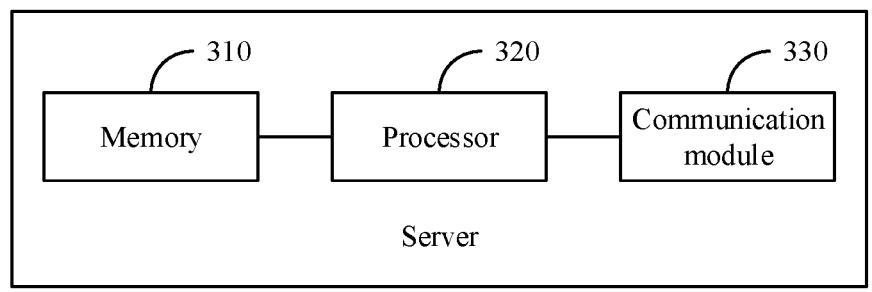
FIG. 11 is a schematic diagram of a structure of a server according to an embodiment of this application.

Based on a same inventive concept, an embodiment of this application further provides a server. FIG. 11 is a schematic diagram of a structure of a server according to an embodiment of this application. As shown in FIG. 11, the server provided in this embodiment may include components such as a memory 310, a processor 320, and a communication module 330.

The memory 310 may be configured to store a computer program and a module. The processor 320 may perform, by running the computer program and the module that are stored in the memory 310, the method performed by the server in the foregoing method embodiment. The memory 310 may mainly include a program storage area and a data storage area. The program storage area may store an operating system, an application program required by at least one function (such as a sound playback function and an image playback function), and the like. The data storage area may store data (such as audio data and a phone book) created based on use of the server, and the like. In addition, the memory 310 may include a high-speed random access memory, and may further include a non-volatile memory, for example, at least one magnetic disk storage device, a flash memory device, or another volatile solid-state storage device.

The processor 320 is a control center of the server, and is connected to all parts of the entire server by using various interfaces and lines. The processor 320 performs various functions of the server and data processing by running or executing a software program and/or a module stored in the memory 310 and invoking data stored in the memory 310. In this way, overall monitoring is performed on the server. Optionally, the processor 320 may include one or more processing units.

The communication module 330 may provide a solution that is applied to the server and that includes a wireless local area network (Wireless Local Area Networks, WLAN) (for example, a Wi-Fi network), Bluetooth, ZigBee, a mobile communication network, a global navigation satellite system (global navigation satellite system, GNSS), frequency modulation (frequency modulation, FM), NFC, and an infrared (infrared, IR) technology. A communication module may be one or more components integrating at least one communication processing module. The communication module 330 may include an antenna, and may receive an electromagnetic wave by using the antenna, perform frequency modulation and filtering processing on an electromagnetic wave signal, and send a processed signal to the processor. The communication module 330 may further receive a to-be-sent signal from the processor 320, perform frequency modulation and amplification on the signal, and convert, by using the antenna, the signal into an electromagnetic wave for radiation. The server may communicate with the terminal device by using the communication module 330.

A person skilled in the art may understand that FIG. 11 is merely an example of a server, and constitutes no limitation on the server. The server may include more or fewer components than those shown in the figure, or combine some components, or have different component arrangements.

The server provided in this embodiment may perform the foregoing method embodiment. An implementation principle and technical effects in this embodiment are similar to those in the method embodiment, and details are not described herein again.

An embodiment of this application further provides a computer-readable storage medium. The computer-readable storage medium stores a computer program, and the computer program is executed by a processor to implement the method according to the foregoing method embodiment.

An embodiment of this application further provides a computer program product. When the computer program product runs on an electronic device, the electronic device is enabled to perform the method according to the foregoing method embodiment. The electronic device may be the terminal device or the server.

When the integrated unit is implemented in a form of a software functional unit and sold or used as an independent product, the integrated unit may be stored in a computer-readable storage medium. Based on such an understanding, in this application, all or some of the processes in the methods in the foregoing embodiments may be implemented by using a computer program to indicate related hardware. The computer program may be stored in a computer-readable storage medium. When the computer program is executed by a processor, the steps of the foregoing method embodiments may be implemented. The computer program includes computer program code, and the computer program code may be in a source code form, an object code form, an executable file form, some intermediate forms, or the like. The computer-readable storage medium may include at least: any entity or apparatus that can carry computer program code to a photographing apparatus/terminal device, a recording medium, a computer memory, a read-only memory (Read-Only Memory, ROM), a random access memory (Random Access Memory, RAM), an electrical carrier signal, a telecommunication signal and a software distribution medium. For example, the computer-readable storage medium may include a USB flash drive, a removable hard disk, a magnetic disk, or an optical disc. In some jurisdictions, according to legislation and patent practice, a computer-readable medium cannot be an electrical carrier signal or a telecommunication signal.

The processor may be a central processing unit (Central Processing Unit, CPU), or may be another general-purpose processor, a digital signal processor (Digital Signal Processor, DSP), an application-specific integrated circuit (Application Specific Integrated Circuit, ASIC), a field-programmable gate array (Field-Programmable Gate Array, FPGA) or another programmable logic device, a discrete gate, a transistor logic device, or a discrete hardware component. The general-purpose processor may be a microprocessor, or the processor may be any conventional processor, or the like.

The memory may include forms such as a non-permanent memory, a random access memory (RAM), and/or a non-volatile memory in the computer-readable medium, for example, a read-only memory (ROM) or a flash memory (flash RAM). The memory is an example of the computer-readable medium.

In the foregoing embodiments, descriptions for all embodiments have respective focuses. For a part that is not described in detail or recorded in an embodiment, refer to a related description in another embodiment.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on a particular application and a design constraint condition that are of the technical solutions. A person skilled in the art may use different methods to implement the described functions for each particular application, but it should not be considered that the implementation goes beyond the scope of this application.

In embodiments provided in this application, it should be understood that the disclosed apparatus/device and method may be implemented in another manner. The described apparatus/device embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or another form.

It should be understood that, when used in the specification and the appended claims of this application, the term "comprises" indicates existence of the described features, wholes, steps, operations, elements, and/or components. However, the existence or addition of one or more other features, wholes, steps, operations, elements, components, and/or sets thereof is not excluded.

It should be further understood that the term "and/or" used in the specification and the appended claims of this application refers to any combination or all possible combinations of one or more of the items listed in association, and includes these combinations.

As used in the specification and the appended claims of this application, the term "if" may be explained, according to the context, as "when" or "once" or "in response to determining" or "in response to detecting". Similarly, the phrase "if determining" or "if [the described condition or event] is detected" may be interpreted, depending on the context, to mean "once determining" or "in response to determining" or "once [the described condition or event] is detected" or "in response to detecting [the described condition or event]."

In addition, in the descriptions of the specification and the appended claims of this application, the terms "first", "second", "third", and the like are merely used for differentiation and description, and shall not be understood as an indication or implication of relative importance.

Reference to "one embodiment" or "some embodiments" described in this specification of this application means that one or more embodiments of this application include a particular feature, structure, or characteristic described with reference to the embodiments. Therefore, statements such as "in one embodiment", "in some embodiments", "in some other embodiments", and "in still some other embodiments" that appear in this specification and differ from each other do not necessarily refer to a same embodiment; instead, it means "one or more, but not all, embodiments", unless specifically emphasized in another manner. The terms "comprise", "include", "have", and other variants thereof all mean "include but are not limited to", unless specifically emphasized in another manner.

Finally, it should be noted that the foregoing embodiments are merely intended for describing the technical solutions of this application, rather than limiting this application. Although this application is described in detail with reference to the foregoing embodiments, a person of ordinary skill in the art should understand that modifications may still be made to the technical solutions described in the foregoing embodiments, or equivalent replacements may still be made to some or all technical features thereof. These modifications or replacements do not make the essence of the corresponding technical solutions depart from the scope of the technical solutions of embodiments of this application.

What is claimed is:

1. A login authentication method, applied to a first terminal and comprising:
   obtaining a short-distance communication identifier of a second terminal, wherein obtaining the short-distance communication identifier of the second terminal comprises:
      obtaining the short-distance communication identifier of the second terminal when the first terminal stores a first token and is in a logout state, wherein the first token is applied for by the first terminal from the server by logging into the target account in advance; and
   wherein automatically logging into the target account comprises:
   in response to a verification of the first token succeeding, automatically logging into the target account;
   in response to determining that the second terminal is a trusted device based on the short-distance communication identifier;
   establishing a short-distance communication connection to the second terminal;
   sending a check code request to the server, wherein the check code request carries the first token, and the check code request indicates the server to return a check code when the verification of the first token succeeds;
   receiving the check code returned by the server, and sending the check code to the second terminal, to indicate the second terminal to send the check code to the server for a verification;
   determining that the verification of the check code succeeds; and
   obtaining a second token of the second terminal; and
   verifying validity of the second token by using a server, wherein the second token is applied for by the second terminal from the server by logging into a target account in advance; and
   in response to the verification of the second token succeeding, automatically logging into the target account.

2. The method according to claim 1, wherein determining that the second terminal is the trusted device based on the short-distance communication identifier comprises:
   in response to the short-distance communication identifier being on a pre-established trusted list, determining that the second terminal is the trusted device.

3. The method according to claim 2, wherein before obtaining the short-distance communication identifier of the second terminal, the method further comprises:
   in response to the target account being successfully logged into, adding the short-distance communication identifier of the second terminal to the pre-established trusted list based on a configuration operation performed by a user, wherein a short-distance communication connection is established between the second terminal and the first terminal.

4. The method according to claim 1, wherein before obtaining the short-distance communication identifier of the second terminal when the first terminal stores the first token and is in the logout state, the method further comprises:
   when the first terminal does not store the first token, sending a token obtaining request to the server in a process of logging into the target account, wherein the token obtaining request requests the server to return the first token when a verification of a target account login request of the first terminal succeeds; and
   receiving and storing the first token returned by the server.

5. The method according to claim 4, wherein the method further comprises:
   in response to detecting that a user enters an operation of logging out of the target account on the first terminal, performing a logout operation, and clearing the first token.

6. The method according to claim 1, wherein determining that the verification of the check code succeeds comprises:
   in response to receiving a unique account identifier returned by the second terminal, determining that the verification of the check code succeeds, wherein the unique account identifier returned by the second terminal is a unique identifier that is of a logged-in account and that is sent by the second terminal when the verification of the check code succeeds; and
   wherein before obtaining the second token of the second terminal, the method further comprises:
   determining that the received unique account identifier is consistent with a unique account identifier of the target account.

7. The method according to claim 1, wherein obtaining the second token of the second terminal, and verifying the validity of the second token by using the server comprises:
   sending the first token to the second terminal, to indicate the second terminal to send the first token to the server for validity verification, and indicate the second terminal to return the second token after the verification of the first token succeeds; and
   receiving the second token sent by the second terminal, and sending the second token to the server for validity verification.

8. The method according to claim 7, wherein both the first token sent by the first terminal to the second terminal and the second token received from the second terminal undergo an encryption processing, both the first token sent by the second terminal to the server and the second token sent by the first terminal to the server undergo a decryption processing, and both the encryption processing and the decryption processing are performed based on a predetermined key.

9. The method according to claim 1, wherein the method further comprises:
   periodically sending, based on a preset time interval, the second token to the server for a verification;
   in response to the verification failing, re-obtaining a second token from the second terminal, and sending the second token to the server for another verification; and
   in response to the verification of the re-obtained second token failing, performing a logout operation.

10. An electronic device, comprising a hardware non-transitory memory and a hardware processor, wherein the non-transitory memory is configured to store a computer program, which when executed by the processor, causes the electronic device to:
   obtain a short-distance communication identifier of a second terminal, wherein obtain the short-distance communication identifier of the second terminal comprises:
      obtain the short-distance communication identifier of the second terminal when the first terminal stores a first token and is in a logout state, wherein the first token is applied for by the first terminal from the server by logging into the target account in advance; and
   wherein automatically logging into the target account comprises:
   in response to a verification of the first token succeeding, automatically logging into the target account;
   in response to determining that the second terminal is a trusted device based on the short-distance communication identifier:
      establish a short-distance communication connection to the second terminal;
      send a check code request to the server, wherein the check code request carries the first token, and the check code request indicates the server to return a check code when the verification of the first token succeeds;
      receive the check code returned by the server, and sending the check code to the second terminal, to indicate the second terminal to send the check code to the server for a verification;
      determine that the verification of the check code succeeds; and
      obtain a second token of the second terminal; and
      verify validity of the second token by using a server, wherein the second token is applied for by the second terminal from the server by logging into a target account in advance; and
   in response to the verification of the second token succeeding, automatically log into the target account.

11. A non-transitory computer-readable storage medium, wherein a computer program is stored on the non-transitory computer-readable storage medium, and when the computer program is executed by a processor, causes the processor to:
   obtain a short-distance communication identifier of a second terminal, wherein obtain the short-distance communication identifier of the second terminal comprises:
      obtain the short-distance communication identifier of the second terminal when the first terminal stores a first token and is in a logout state, wherein the first token is applied for by the first terminal from the server by logging into the target account in advance; and
   wherein automatically logging into the target account comprises:
   in response to a verification of the first token succeeding, automatically logging into the target account;
   in response to determining that the second terminal is a trusted device based on the short-distance communication identifier:
      establish a short-distance communication connection to the second terminal;
      send a check code request to the server, wherein the check code request carries the first token, and the check code request indicates the server to return a check code when the verification of the first token succeeds;
      receive the check code returned by the server, and sending the check code to the second terminal, to indicate the second terminal to send the check code to the server for a verification;
      determine that the verification of the check code succeeds; and
      obtain a second token of the second terminal; and
      verify validity of the second token by using a server, wherein the second token is applied for by the second terminal from the server by logging into a target account in advance; and
   in response to the verification of the second token succeeding, automatically log into the target account.

\* \* \* \* \*

UNITED STATES PATENT AND TRADEMARK OFFICE
CERTIFICATE OF CORRECTION

PATENT NO. : 12,231,565 B2  
APPLICATION NO. : 17/793322  
DATED : February 18, 2025  
INVENTOR(S) : Lin et al.

Page 1 of 1

It is certified that error appears in the above-identified patent and that said Letters Patent is hereby corrected as shown below:

In the Claims

Claim 1: Column 31, Line 37: "tion identifier;" should read as -- tion identifier: --.

Signed and Sealed this
Twenty-first Day of October, 2025

John A. Squires
*Director of the United States Patent and Trademark Office*